(12) United States Patent
Fabrizio et al.

(10) Patent No.: US 7,731,101 B2
(45) Date of Patent: Jun. 8, 2010

(54) STRAW APPARATUS FOR MIXING AND DRINKING BEVERAGES

(76) Inventors: Dean Fabrizio, 6306 Main St., Trumbull, CT (US) 06611; Harakanois Moisiadis, 45 Wilton Ave., Norwalk, CT (US) 06851

(*) Notice: Subject to any disclaimer, the term of this patent is extended or adjusted under 35 U.S.C. 154(b) by 0 days.

(21) Appl. No.: 12/214,635

(22) Filed: Jun. 20, 2008

(65) Prior Publication Data

US 2009/0314852 A1 Dec. 24, 2009

(51) Int. Cl.
*A47G 21/18* (2006.01)
*B01F 15/00* (2006.01)

(52) U.S. Cl. .................... 239/33; 239/12; 239/289; 366/129

(58) Field of Classification Search .......... 239/12, 239/24, 33, 142, 289; 366/129, 130; 220/705–710; 215/388
See application file for complete search history.

(56) References Cited

U.S. PATENT DOCUMENTS 3,776,458 A * 12/1973 Chunga, Sr. ............. 239/33

* cited by examiner

*Primary Examiner*—Darren W Gorman
(74) *Attorney, Agent, or Firm*—Monahan & Costello, LLC; Thomas J. Monahan

(57) ABSTRACT

An expandable drinking and mixing straw apparatus that can be compactly stored and expanded when necessary to provide a deployed dual-functionality mixing and drinking apparatus. The several embodiments of the straw apparatus provide a unified apparatus as well as functionally equivalent embodiments with two straw sub-component members defined by an outer straw and an inner straw which sub-component members are bonded together at specified locations. When force is applied to the undeployed straw apparatus, a plurality of veins expands from the apparatus to provide mixing functionality without compromising suction functionality. Straw sub component bonding, vein bending and stopping, and method of deployment of the drinking and mixing straw apparatus are disclosed.

26 Claims, 24 Drawing Sheets

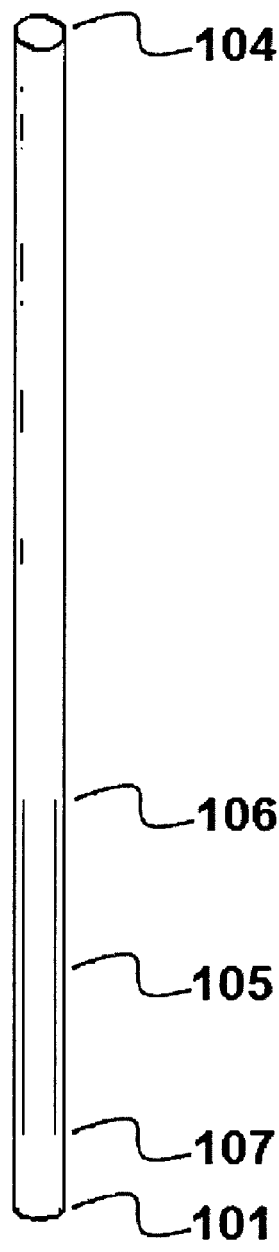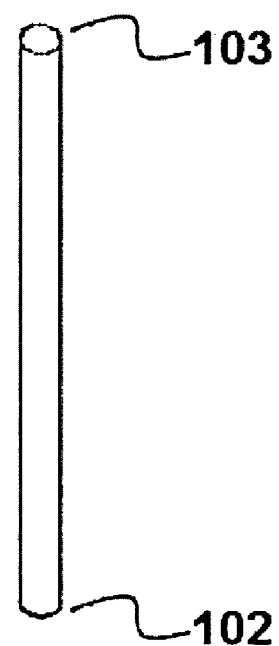
FIG. 1A  FIG. 1B
FIG. 1

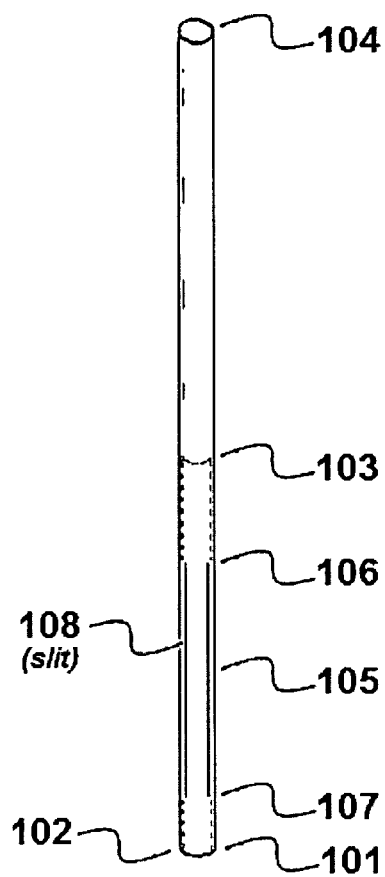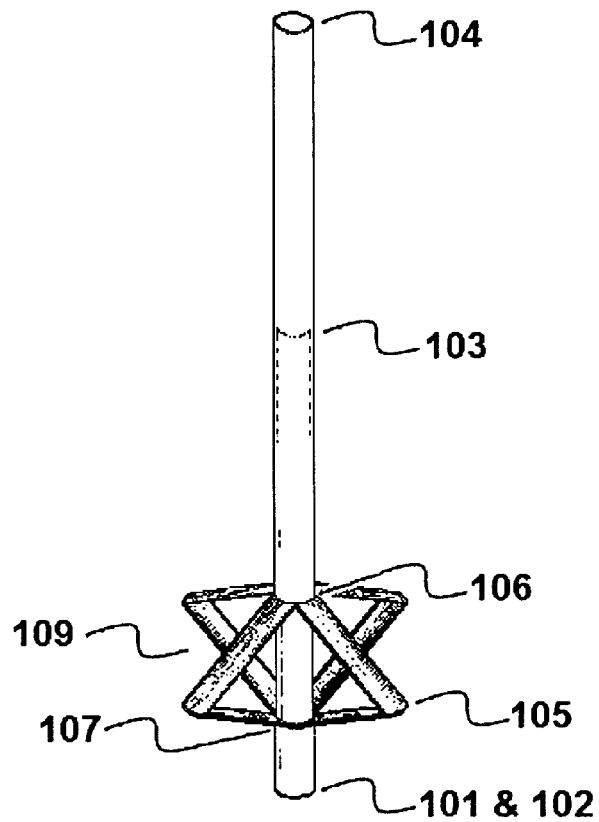
FIG. 2A        FIG. 2B
FIG. 2

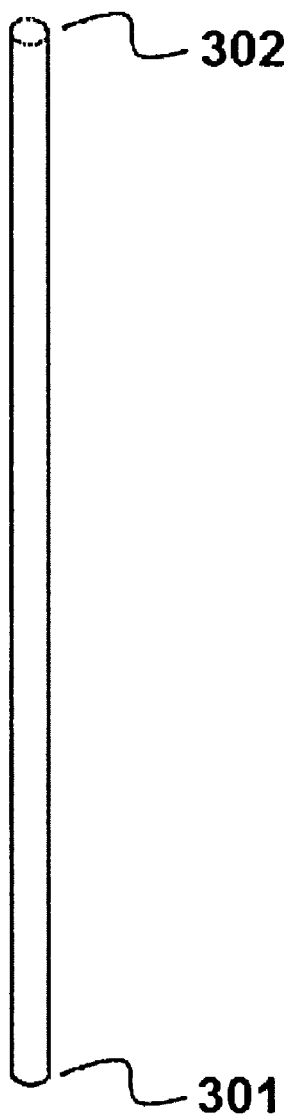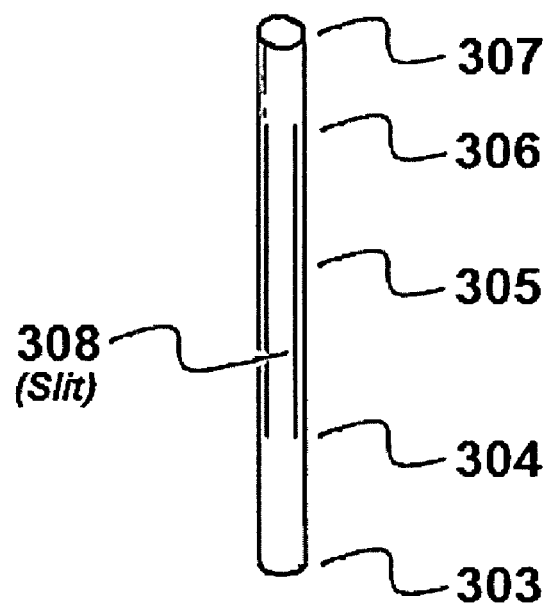
FIG. 3A  FIG. 3B
FIG. 3

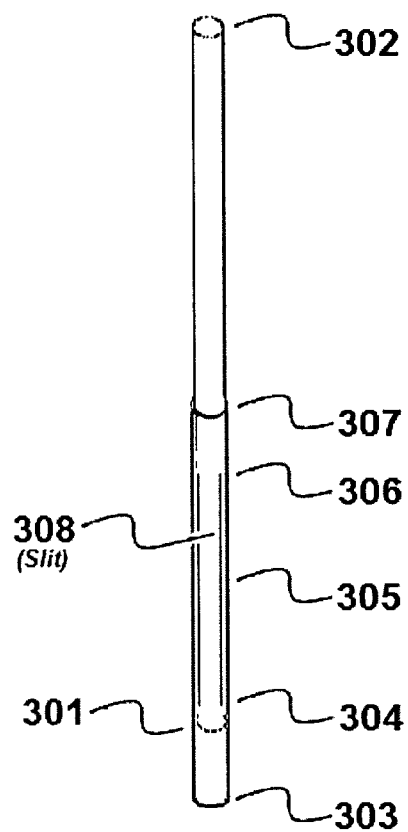
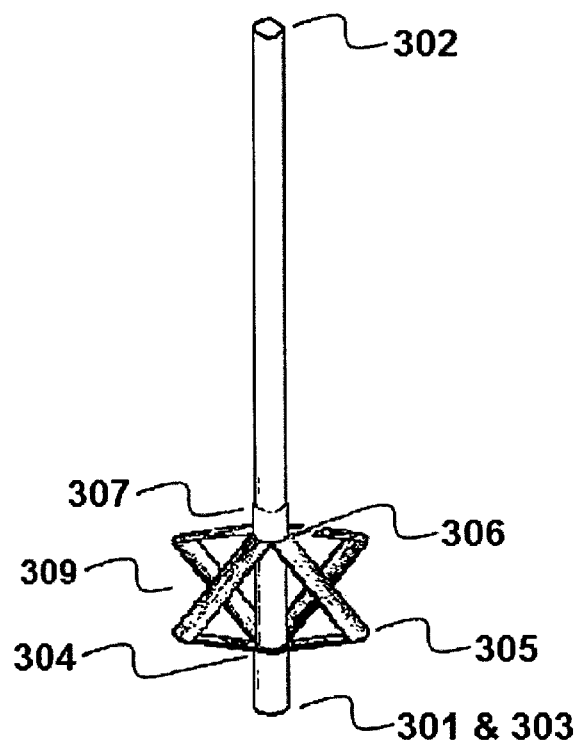
FIG. 4A        FIG. 4B
FIG. 4

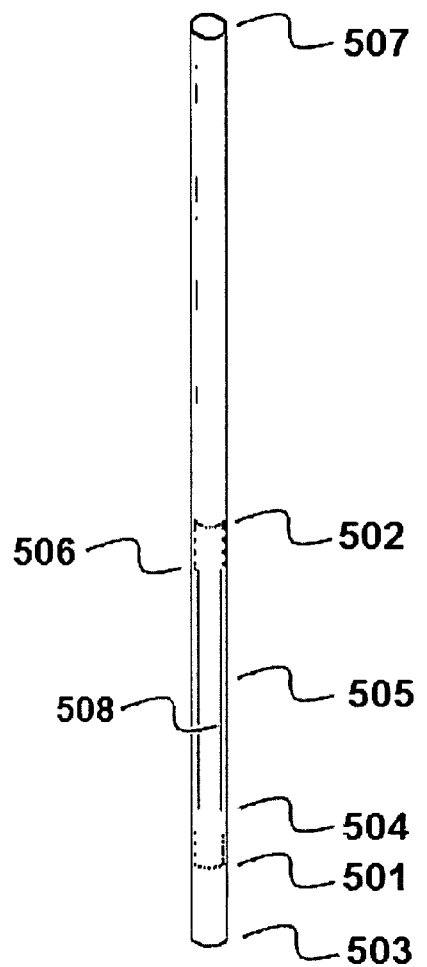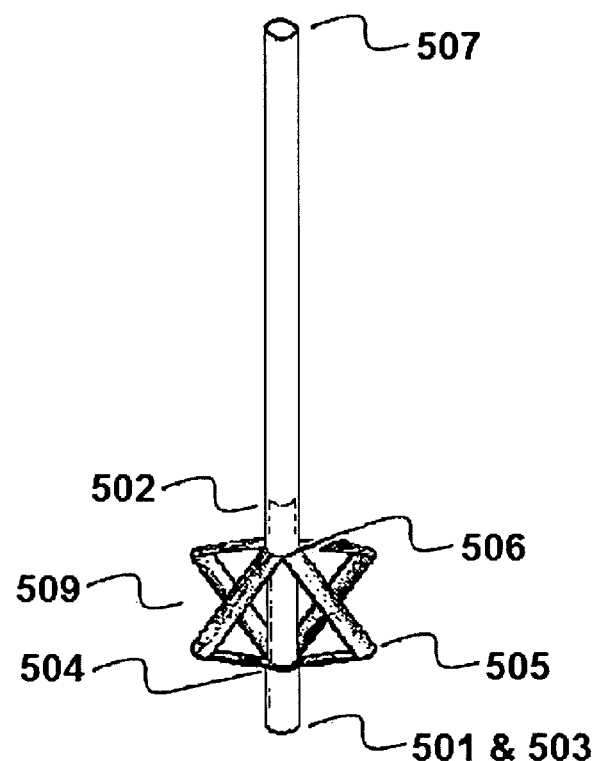
FIG. 6A   FIG. 6B
FIG. 6

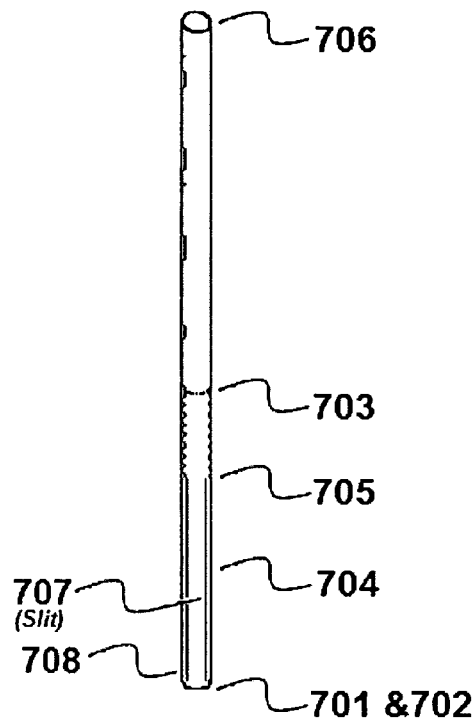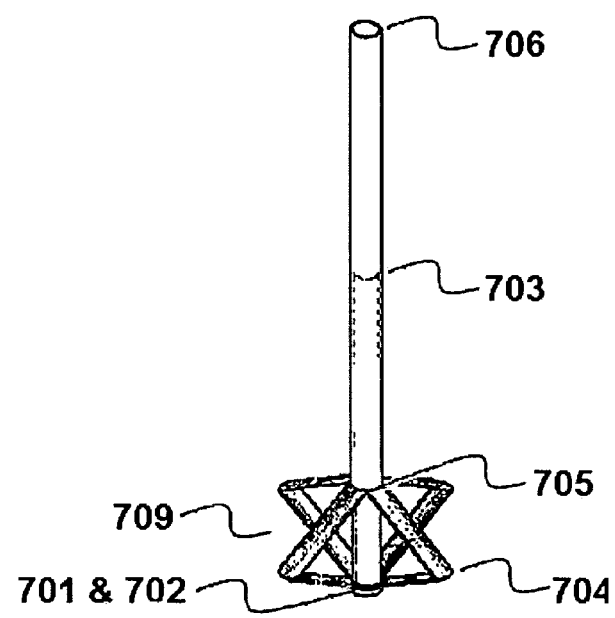
FIG. 8A    FIG. 8B
FIG. 8

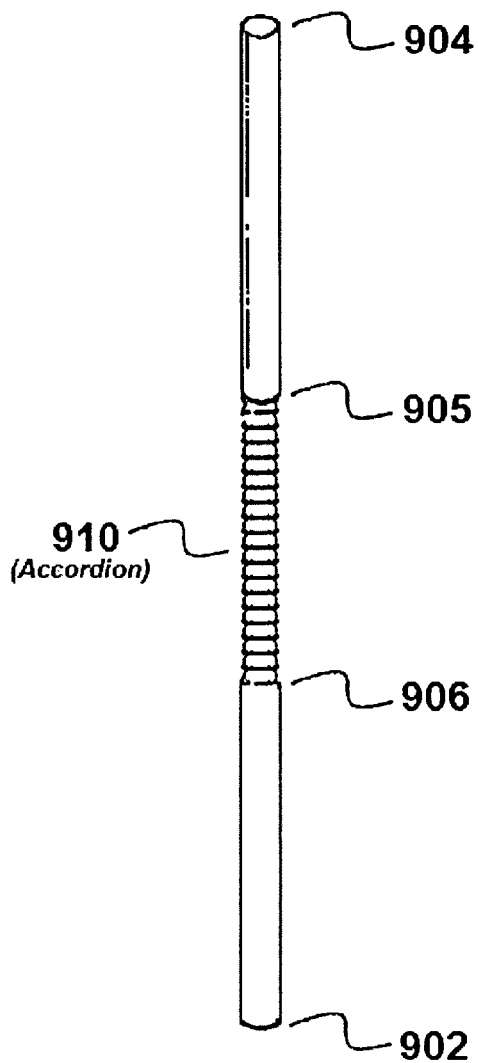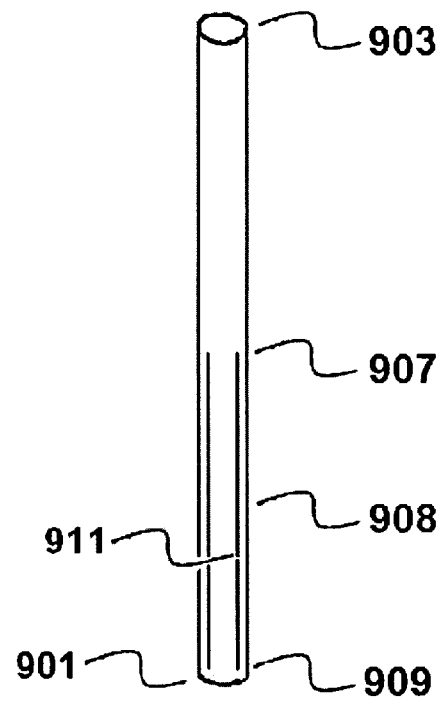
FIG. 9A  FIG. 9B
FIG. 9

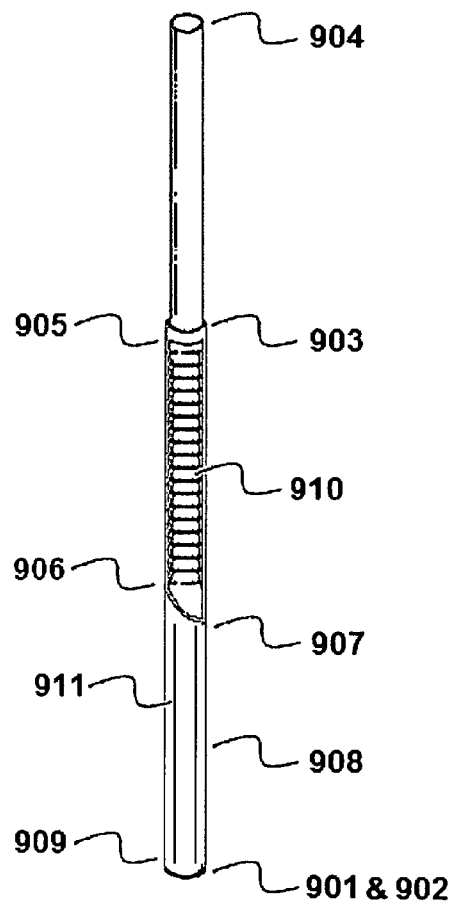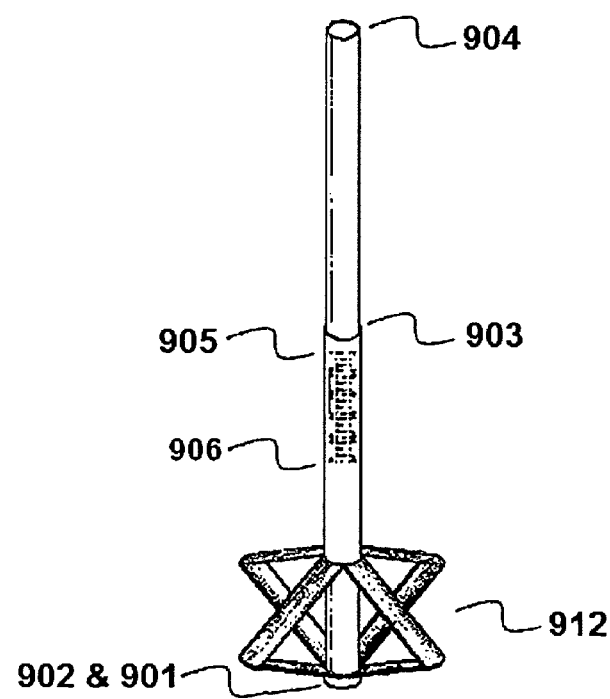
FIG. 10A  FIG. 10B
FIG. 10

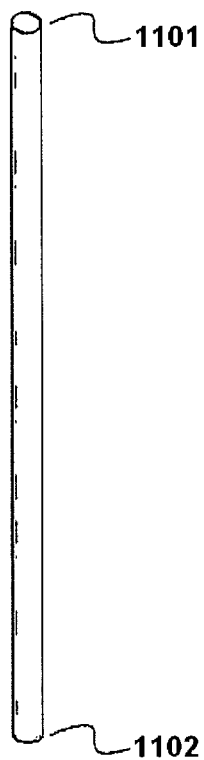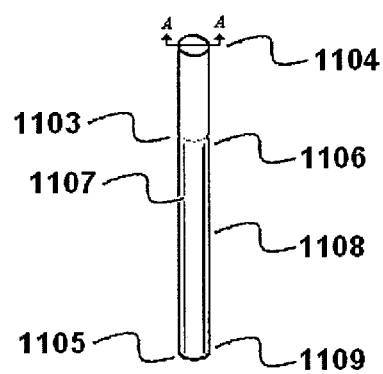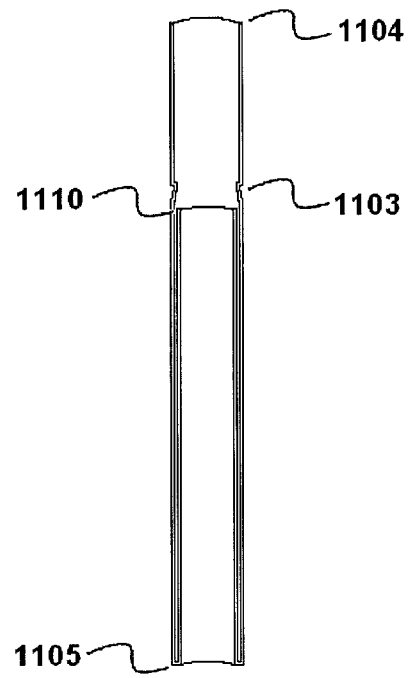
FIG. 11A  FIG. 11B  FIG. 11C
FIG. 11

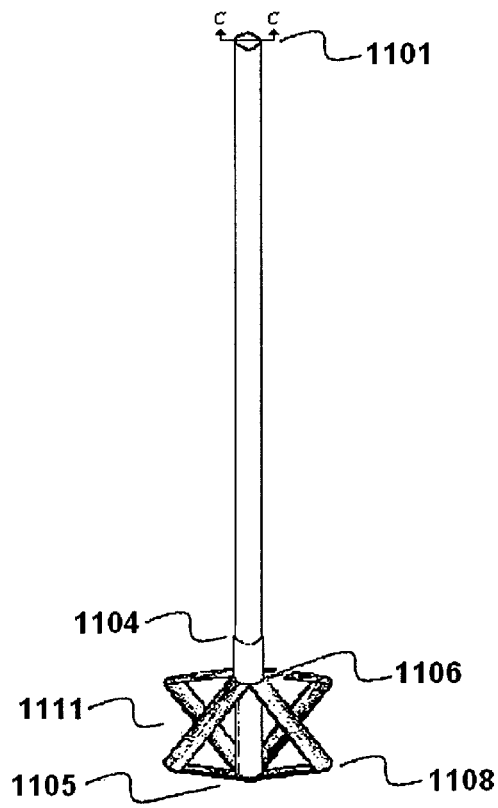
FIG. 12C
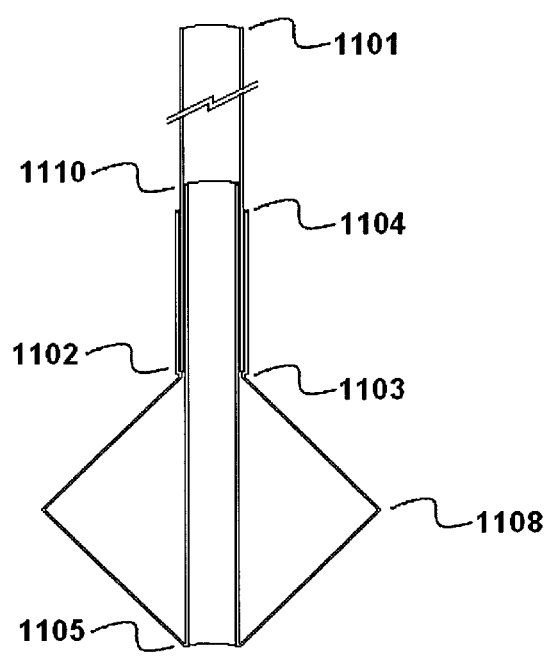
SECTION C-C
FIG. 12D
FIG. 12

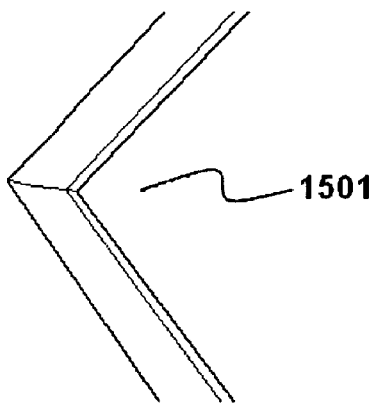
FIG. 15A
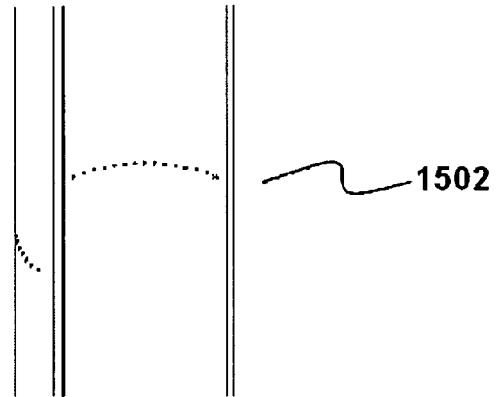
FIG. 15B
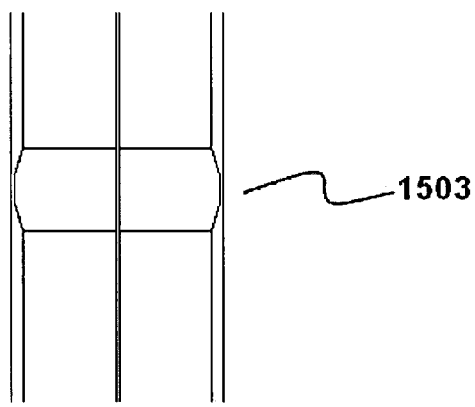
FIG. 15C
FIG. 15

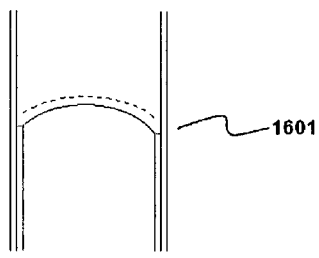
FIG. 16A
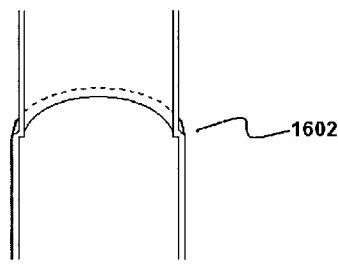
FIG. 16B
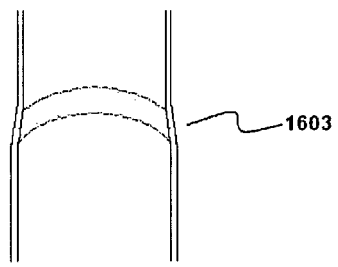
FIG. 16C
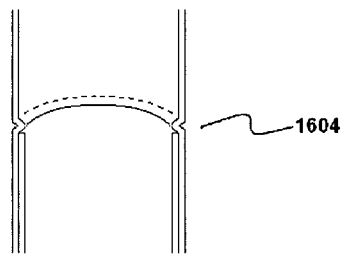
FIG. 16D
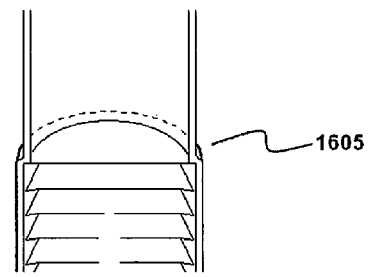
FIG. 16E
FIG. 16

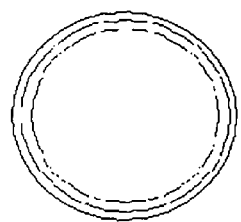
FIG. 17A
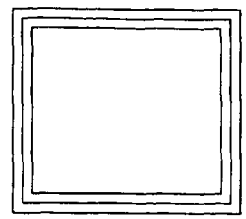
FIG. 17B
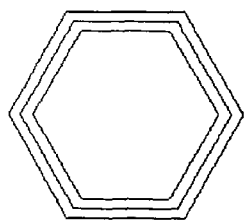
FIG. 17C
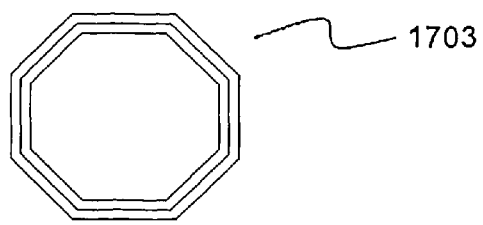
FIG. 17D
FIG. 17

FIG. 18A  FIG. 18B

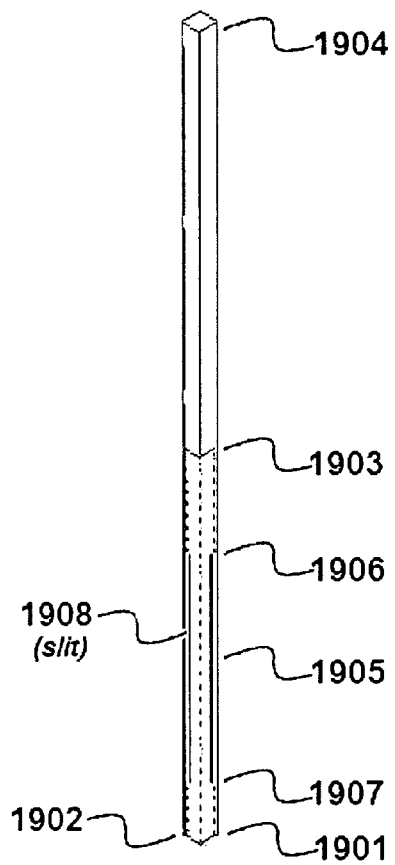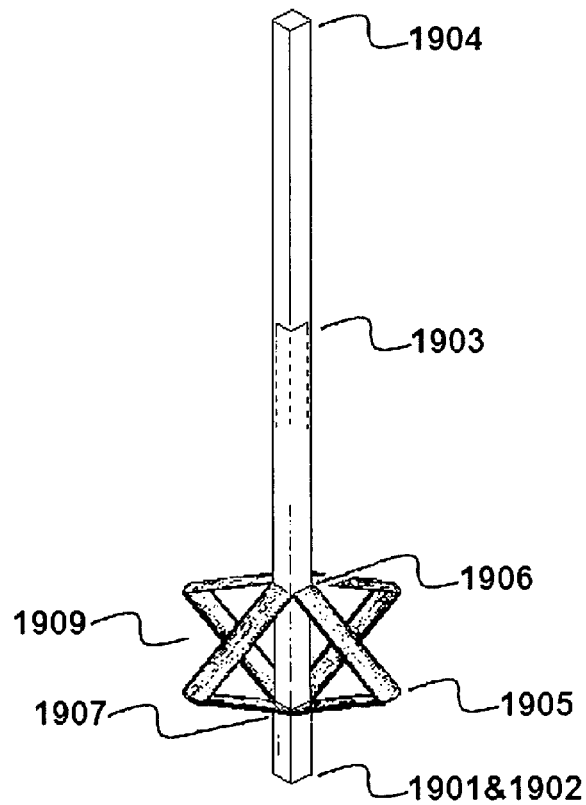
FIG. 19A  FIG. 19B
FIG. 19

FIG. 20A     FIG. 20B

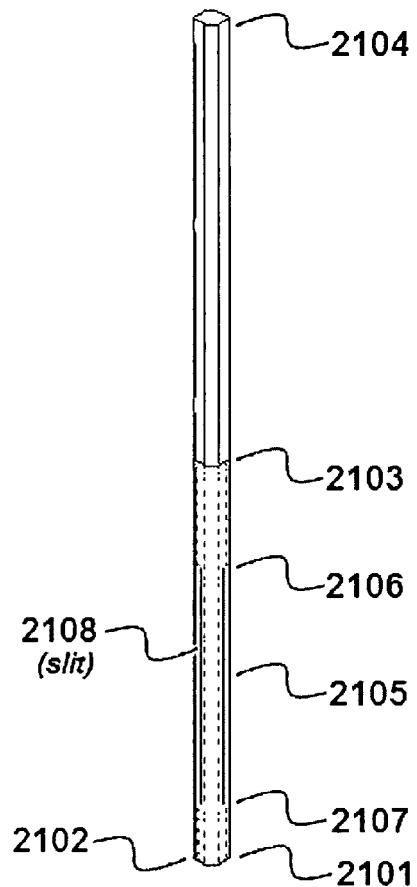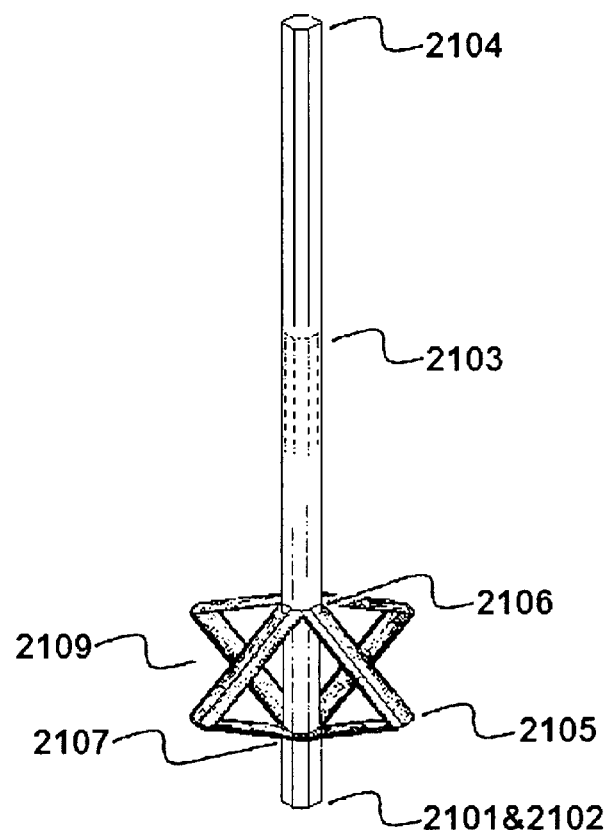
FIG. 21A    FIG. 21B
FIG. 21

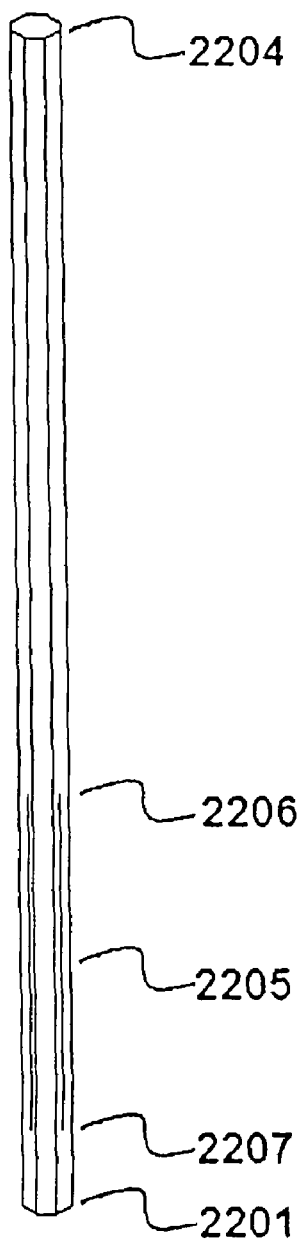 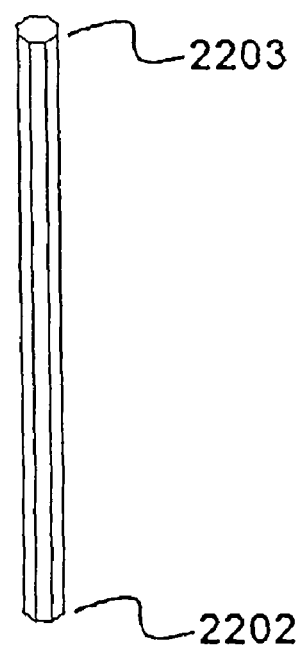
FIG. 22A                FIG. 22B
FIG. 22

FIG. 23A  FIG. 23B

STRAW APPARATUS FOR MIXING AND DRINKING BEVERAGES

BACKGROUND OF THE INVENTION

1. Field of the Invention

The present invention relates to drinking straws. More specifically, the invention relates to various embodiments of a drinking straw apparatus, preferably of plastic composition, wherein upon the application of force to the straw deploys mixing means thereby providing both drinking and mixing means for liquid beverages.

2. Description of the Prior Art

By way of background, a variety of drinking straws are known in the art for transferring a liquid from a cup or other container to your mouth. Early straws of narrow bore, made from hollow stems of various grasses and from paper, evolved to paper coated with wax and then to plastics. Today most straws are made of plastic with a larger bore for convenient drinking. Plastic straws have various shapes. Straws may be straight, bendable with a fluted-type hinge near the top, twisted providing liquid through a winding path, miniaturized and attached to juice boxes with a pointed tip for penetration of the juice box, have cut-away shapes at the end to act a spoons or for stirring, have telescoping capability, multiple tubes, have weights, base plates for stirring and/or squeezing fruit, have fins for stirring, split ends, and the like. Various drinking straws are described in U.S. Pat. Nos. 2,613,107; 2,979,267; 3,211,379; 3,315,405; 4,636,887; 4,636,887; 4,636,887; 4,909,437; 5,038,476; 6,056,206; 6,375,092; 6,561,434; and 6,676,032.

In spite of the many variations of drinking straws, there is a need for a straw apparatus that can provide both drinking and mixing capabilities, that can be conveniently stored without taking up significant space, that can be economically manufactured, and that can have structural integrity to stir separating liquids or liquid/solid mixtures or suspensions.

Accordingly, it is an object of the present invention to provide a new and improved straw apparatus for stirring, mixing, blending and drinking liquids.

Another object of the present invention is to provide a drinking straw apparatus that provides means for mixing and stirring of liquids that is compact.

Yet another object of the present invention is to provide a straw apparatus that is conveniently stored in a compact form and can deploy mixing means for mixing and drinking liquid beverages.

These and other objects and advantages of the present invention and equivalents thereof, are achieved by the methods and systems of the present invention described herein and manifest in the appended claims.

SUMMARY OF THE INVENTION

The present invention is directed to a novel expandable drinking and mixing straw apparatus.

The present invention discloses an expandable drinking and mixing straw apparatus comprising two bonded straw subunits. There is an outer first straw member having a first diameter, a first length, an upper end, a lower end, a plurality of radially expandable vein members orientated generally parallel to each other along the longitudinal axis of the outer straw. Each of the vein members has (i) an upper hinge or hinge-like attachment means and (ii) a lower hinge or hinge-like attachment means and (iii) at least one bending means between the hinge attachments. There is an inner second straw member located internal to the outer first straw having a second diameter smaller than the first diameter of the outer first straw and, having a second length different from the first length of the outer first straw, having an upper end, a lower end, and optionally having a collapsible accordion region. The two straws of the apparatus of the invention have at least one bonding means between the first straw and the second straw members and a means for stopping deployment of the radially expandable vein members at a predetermined position.

The straw apparatus of the invention may have different shapes, including but not necessarily limited to having tubular first and second straws, having straws that are square in cross section with rectangular sides, or having straws that consist of equal rectangular sides having a plurality of sides. A preferred embodiment of the invention has first and second straw members that are tubular. In the tubular embodiment, the first and second straw members are essentially circular or oval in cross section. A preferred embodiment is a tubular construction where the inner and outer straw members are essentially circular in cross section. The straw members of the straw apparatus have a diameter that is preferably from about 5 mm to about 8 mm, but may range from about 3 mm to about 20 mm. The vein members of the outer straw are essentially parallel to the longitudinal axis of the straw apparatus. The vein members of the outer straw are each defined by the upper and lower hinge attachments and two parallel slits in the straw body and range from 1% to 3% the length of straw in width (ideal vein distance width=$2\pi r$ divided by the number of desired slits), and range from 5% to 40% the length of the straw in length. The straw apparatus has two straw members (i.e., the inner and outer straws), unless it is manufactured as one piece where the apparatus is a single structure. The two straw members are bonded together (have a bonding means) in at least one bonding position. This bonding means is at a position selected from: (i) the co-located bottoms of the first straw and the second straw where the first length of the outer straw is longer than the second length of the inner second straw; (ii) the top of the outer first straw where the first length of the outer first straw is shorter than the second length of the inner second straw and the bottom of the outer first straw is below the bottom of the inner second straw; (iii) the top of the inner second straw where the first length of the outer straw is longer than the second length of the inner second straw and where the bottom of the inner shorter straw is above the bottom of longer straw; (iv) the co-located bottoms of the outer first straw and the inner second straw where the outer first straw is longer than the inner second straw; and (v) the co-located bottoms of the first straw and the second straw and the top of the outer first straw where the first length of the inner straw is longer than the second length of the outer second straw.

The overall length of the straw apparatus of the invention may vary to any convenient length but is generally from about 100 mm to about 400 mm in length, and preferably from about 200 mm to about 300 mm in length.

The straw apparatus of the invention has a way or means for stopping deployment of the radially expandable vein members expanding from their upper and lower hinge or hinge-like attachments at a predetermined position. This means of stopping deployment is selected from the group consisting of: friction, notching, tapering, detenting, harmonic compression and any combination thereof.

Also, the straw apparatus of the invention has a way or means for permitting the bending of the vein members at predetermined locations. The bending means is selected from the group consisting of: vein member crimp, vein member perforation, vein member thinning, or vein member material properties or any combination thereof.

In addition to the straw apparatus of the invention, a method for deploying the expandable drinking and mixing straw apparatus consisting of a single component apparatus or two bonded-together sub-component straws (i.e., an inner straw and an outer straw) is disclosed. The apparatus is deployed by applying sufficient downwardly directed force to the top of the straw apparatus embodiments to start the deployment process. In two member embodiments of the invention, the bonded inner straw and the outer straw members slide against each other. The bonding locations of the sub-component straws of the various embodiments of the straw apparatus are described above. The downwardly directed force causes the plurality of vein members to expand radially from the outer first straw member while remaining attached to their upper and lower hinge attachments. In the deployment, the veins bend at one or more predetermined bending locations, each of which has a bending means, and the vein deployment stops. The stopping of the expanding and bending of the vein members at a predetermined position (with the means for stopping deployment of the radially expandable vein members) provides a fully deployed drinking and mixing straw apparatus.

Embodiments of the invention (i.e., first, fourth, fifth and sixth embodiments) may be fabricated as a single pieces or as two subunit pieces (i.e., inner and outer straw members). An expandable single component drinking and mixing straw apparatus comprises an upper end and a lower end and optionally a collapsible accordion region; a diameter shape selected from the group of: tubular, square, rectangular or polygon having a plurality of equal sides; a plurality of vein members expandable radially upon the application of downward force each of which vein members (i) is defined by two slits generally parallel to each other along the straw's longitudinal axis; (ii) has an upper hinge attachment means and a lower hinge attachment means; (iii) has at least one bending means between said upper and said lower hinge attachment means; and (iv) has a means for stopping deployment of said radially expandable vein members at a predetermined position.

Also, a single component straw apparatus embodiment, when downwardly directed force is applied, stops deployment of its radially expandable vein members expanding from their upper and lower hinge attachment by means selected from the group consisting of: friction, notching, tapering, detenting, harmonic compression and any combination thereof.

Single component straw embodiments have bending means of their vein members selected from the group of: vein member crimp/crease, vein member perforation, vein member thinning, vein member material properties or any combination thereof.

As with functionally equivalent two-member embodiments single components embodiments have: (1) vein members that are each defined by two parallel slits having a width from 1% to 3% the length of the straw and preferably have a width equal to $2\pi r$ divided by the number of desired slits, and the vein members range in length from 5% to 40% of the length of the straw; (2) have diameters from about 3 mm to about 20 mm, and preferably from about 5 mm to about 8 mm, and have a length from about 100 mm to about 400 mm and preferably from about 200 mm to about 300 mm.

Unless otherwise defined, all technical and scientific terms used herein have the same meaning as commonly understood by one of ordinary skill in the art to which this invention belongs. Although method and materials similar or equivalent to those described herein can be used in the practice or testing of the present invention, preferred methods and materials are described below. All publications, patent applications and other references mentioned herein are incorporated by reference in their entirety. In the case of conflict, the present specification, including definitions, will control. In addition, the materials, methods and examples are illustrative only and not intended to be limiting.

Other features and advantages of the present invention will be apparent from the following detailed description, and from the claims.

BRIEF DESCRIPTION OF THE DRAWINGS

FIG. 1 is a perspective drawing of the unassembled components of an undeployed first embodiment of the invention; FIG. 1A is an outer straw member and FIG. 1B is an inner straw member.

FIG. 2 is a perspective drawing of assembled components of the embodiment of FIG. 1; FIG. 2A is undeployed and FIG. 2B is deployed.

FIG. 3 is a perspective view of the unassembled components of an undeployed second embodiment of the invention; FIG. 3A is the inner straw member and FIG. 3B is the outer straw member.

FIG. 4 is a perspective drawing of the assembled components of the embodiment of FIG. 3; FIG. 4A is undeployed and FIG. 4B is deployed.

FIG. 6 is a perspective view of the assembled members of the embodiment of FIG. 5; FIG. 6A is undeployed and FIG. 6B is deployed.

FIG. 7A is the inner straw member; FIG. 7B is the outer straw member.

FIG. 8 is a perspective view of the assembled members of the embodiment of FIG. 7; FIG. 8A is undeployed and FIG. 8B is deployed.

FIG. 9 is a perspective view of the unassembled components of an undeployed fifth embodiment of the invention; FIG. 9A is the inner straw member; FIG. 9B is the outer straw member.

FIG. 10 is a perspective view of the assembled members of the embodiment of FIG. 9; FIG. 10A is undeployed and FIG. 10B is deployed.

FIG. 11 is a perspective view of the unassembled components of an undeployed sixth embodiment of the invention; FIG. 11A is the inner straw; FIG. 11B is the outer straw; FIG. 11C is a longitudinal midline section (A-A) of the outer straw 11B.

FIG. 12A illustrates this embodiment undeployed; FIG. 12C illustrates this embodiment deployed; FIG. 12B is a longitudinal midline section (B-B) of the undeployed embodiment 12A; FIG. 12C is the deployed deployed form of this sixth embodiment; FIG. 12D is a longitudinal midline section (C-C) of the deployed embodiment of 12C.

FIG. 15 is a diagrammatic representation of means of bending of veins in embodiments of the apparatus of the invention;

FIG. 15A illustrates crimping, FIG. 15B illustrates perforation; and FIG. 15C illustrates thinning.

FIG. 16 is a diagrammatic representation of means of terminating deployment of veins of apparatus of the invention; FIG. 16A illustrates friction means; FIG. 16B illustrates notching means; FIG. 16C illustrates tapering means; FIG. 16D illustrates detent means; and FIG. 16E illustrates harmonic compression means.

FIG. 17 illustrates various cross sections of straws of the invention; FIG. 17A illustrates a oval cross section; FIG. 17B illustrates a square cross section; FIG. 17C illustrates a hexagon cross section; and FIG. 17D illustrates an octagon cross section.

FIG. 18A is an outer straw member and FIG. 18B is an inner straw member.

FIG. 19 is a perspective drawing of the assembled components the embodiment of the invention of FIG. 18 having straws with square cross sections; FIG. 18A is an undeployed apparatus and FIG. 18B is a deployed apparatus.

FIG. 20A is an outer straw member and FIG. 20B is an inner straw member.

FIG. 21 is a perspective drawing of the assembled components of the embodiment of the invention of FIG. 20 having straws with square cross sections; FIG. 21A is an undeployed apparatus and FIG. 21B is a deployed apparatus.

FIG. 22 is a perspective drawing of the unassembled components of an undeployed first embodiment of the invention (c.f., FIG. 1) having straws with octagon cross sections; FIG. 22A is an outer straw member and FIG. 22B is an inner straw member.

FIG. 23A is an undeployed apparatus and FIG. 23B is a deployed apparatus.

DETAILED DESCRIPTION OF THE INVENTION

Figures 5, 5A, 5B:
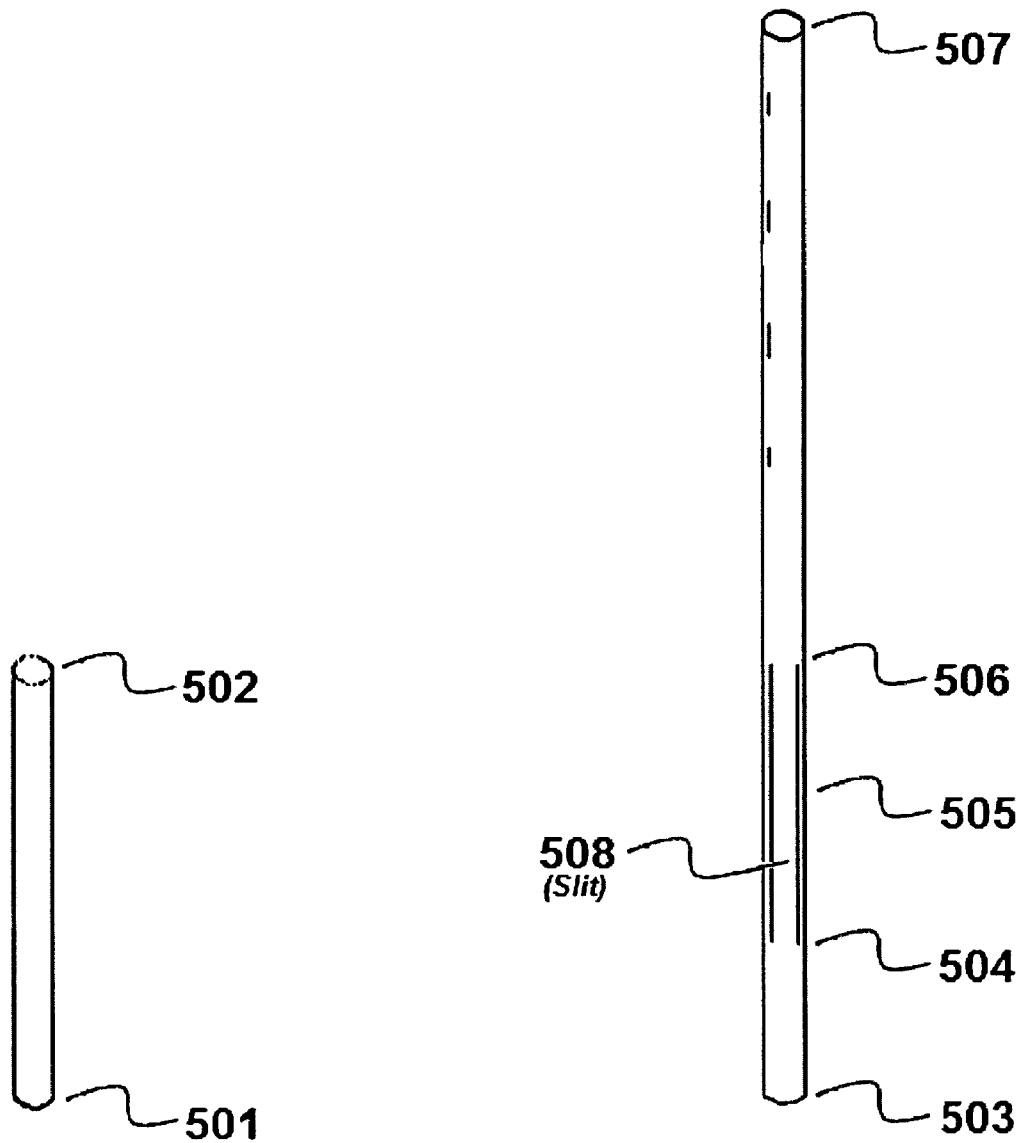
FIG. 5 is a perspective view of the unassembled components of an undeployed third embodiment of the invention.
FIG. 5A is the inner straw member.
FIG. 5B is the outer straw member.

The present invention is directed to drinking straw devices for mixing and drinking liquid beverages, and methods of use and manufacture.

Referring now to FIG. 1, there is shown a perspective view of the unassembled components of an undeployed first embodiment of the invention. This embodiment has two components or members. FIG. 1A is an outer straw that is the first member and FIG. 1B is an inner straw that is the second member of this embodiment. The outer straw of FIG. 1A is longer than the inner straw of 1B and has a diameter that is slightly larger than that of the inner straw in order that the inner straw may fit or slide into the outer straw. The inner straw is preferably about 40% the length of the outer straw, but may range between 20% and 60% of the length of the outer straw. The outer straw has a bottom or proximal end 101 and a top or distal end 104, and a plurality of longitudinal slits in the straw that cut through or substantially penetrate the straw, two of which are illustrated. Each slit 108 begins at attachment point 106, which is preferably about 70% of the distance from the top or distal end of the outer straw, and ends at attachment point 107 that is preferably about 95% of the distance from the distal end of the outer straw. Two slits are required for each mixing vein appendage that will allow the veins, when the inner straw and the outer straw are assembled and when force is applied to the end 104 of the straw, (i) to separate from the straw body along the slits by folding outward or deploying and (ii) to bend or buckle at point 105 located approximately at the mid-point of each vein. The veins buckle outward from attachment points 106 and 107. Each mixing vein is predisposed to bend or buckle outward at point 105 by virtue of a horizontal crease, crimp, perforation, material thinning, material properties or other treatment process across the vein at point 105 to facilitate buckling. The number of fold-out vein appendages, each requiring two slits, may vary but is preferably between 2 and 6 The 2 slits providing a fold-out member are parallel to each other along the longitudinal axis of the outer straw and may be of convenient distance from each other preferably $2\pi r$ divided by the number of desired slits, so as to permit the desired fold-out deployment when downward force is applied. The inner straw of FIG. 1B has a proximal end 102 and a distal end 103 and a diameter slightly less than the diameter of the outer straw of FIG. 1A. The diameters of the outer and inner straws may be of any convenient size for drinking preferably range between 5 mm and 8 mm, but may range between 3 mm and 20 mm with the inner straw sized to conveniently insert into the outer straw (c.f., FIG. 2). Generally the respective straw thickness is the difference in diameter between the inner and outer straws. To form a single undeployed straw apparatus the inner straw is inserted into the outer straw until the proximal end of the outer straw 101 meets the proximal end of the inner straw 102. The straws are bonded, either chemically thermally, or mechanically at co-located points 101 and 102 when the inner straw 1B is inserted into the outer straw 1A forming a fully assembled straw apparatus as illustrated in FIG. 2.

Referring now to FIG. 2, shown is a perspective drawing of assembled components of the first embodiment illustrated in FIG. 1 (i.e., the outer straw of FIG. 1A bonded with inner straw of FIG. 1B). FIG. 2A is the undeployed structure of the first embodiment and FIG. 2B is the deployed form of this embodiment. In the assembled undeployed form of FIG. 2A the straw may be conveniently stored and stocked for use in the same fashion as a regular straw. In the stored undeployed form, the straw apparatus of the invention will be about 20% longer than a regular or plain straw to allow for return to the typical straw length after the straw is compressed into its mixing configuration. Commercial straws are usually about 260 mm in length and range in length from about 100 mm to 400 mm. In FIGS. 2A and 2B, the bottom or proximal end of the outer straw 101 is co-located with the bottom or proximal end of the inner straw 102. Shown is the top or distal end of the inner straw 103, vein slits in the outer straw 108 that runs from point 106 to point 107, and vein bending point 105. The straw apparatus of FIG. 2A can be deployed into the mixing configuration of FIG. 2B by compression, specifically by applying downward force to the end 104 of the undeployed straw of FIG. 2A axially through points 101 and 102. Such application of force (i) causes the inner straw (FIG. 1B) to slide into the outer straw (FIG. 1A), and (ii) causes the veins, the margins of which are defined by the slits, to simultaneously separate from the body of the straw and buckle or bend at point 105. FIG. 2B shows the first embodiment straw apparatus in a deployed configuration having four veins 109. Although providing a mechanical crimp in a vein member at point 105 is a preferred method of inducing vein buckling, any means of weakening the vein so as to predispose buckling at this point may be used (i.e., crimping, perforation; thinning, material properties, etc.). The suction capability of the straw apparatus is not compromised by the deployment of the mixing veins as the end of the outer straw is bonded to the inner straw (i.e., at points 101 and 102) and the friction of the surface area from point 103 to point 106 provides an intact sleeve or continuous column in the same direction of the flow of the drinking liquid. In all embodiments of the invention, the slits that define the boundaries of the mixing veins, the attachment points of the veins, and the buckling or bending points of the veins, are made and as described in connection with the first embodiment of the invention illustrated in FIGS. 1 and 2.

Referring now to FIG. 3, there is shown a perspective view of the unassembled components of an undeployed second embodiment of the invention. As with the first embodiment of the invention illustrated in FIGS. 1 and 2, this second embodiment also has two components or members that are assembled into the functional straw apparatus of the invention. FIG. 3A is an inner straw that is the first member and FIG. 3B is an outer straw that is the second member of this embodiment. The inner straw of FIG. 3A is longer than the outer straw of 3B and has a diameter that is slightly smaller than that of the outer straw in order that the inner straw may fit into the outer straw and slide upon deployment. The outer straw is preferably about 40% the length of the inner straw, but may range between 20% and 60% of the length of the outer straw. The outer straw of FIG. 3B has a bottom or proximal end 303 and a top or distal end 307, and a plurality of longitudinal slits in the straw that cut through or substantially penetrate the straw, two of which are illustrated. Each slit 308 begins at attachment point 306, which is preferably about 60% of the distance from the top or distal end of the inner straw, and ends at attachment point 304 that is preferably about 85% of the distance from the distal end of the inner straw. As with all configurations of the invention, two slits are required for each mixing vein appendage that will, in this configuration, when the two straws are assembled and when force is applied to the end 302 of the inner straw, allow the veins of the outer straw (i) to separate from the assembled straw body along the slits by folding outward or deploying and (ii) to bend or buckle at point 305 located approximately at the mid-point of each vein. The veins deflect outward from attachment points 306 and 304. Each mixing vein is predisposed to bend or buckle outward at point 305 by virtue of a horizontal crease, crimp, perforation, material thinning, material properties or other treatment process across the vein at point 305 to facilitate buckling. In this second embodiment, the structure and function of the stirring veins, the number of slits/vein, the spacing of slits, the nature of the slits, the number of veins, the formation of and location of the buckling point, the function of the attachment points, the differing straw diameters, and the size of the assembled embodiment, are as described with the first embodiment of FIGS. 1 and 2. The inner straw of FIG. 3A has a proximal or bottom end 301 and a distal or top end 302 and a diameter slightly less than the diameter of the outer straw of FIG. 3B so that it may conveniently fit into outer straw FIG. 3B. To form a single undeployed straw apparatus the inner straw FIG. 3A is inserted into the outer straw 3B as illustrated in FIG. 4. The straws are bonded, either chemically, thermally, or mechanically at point 307 as shown in the FIG. 4 assembly.

Referring now to FIG. 4, shown is a perspective drawing of the assembled components of the second embodiment illustrated in FIG. 3 (i.e., the outer straw of FIG. 3B bonded with inner straw of FIG. 3A). FIG. 4A is the undeployed structure of this second embodiment and FIG. 4B is the deployed form of this embodiment. In the assembled undeployed form of FIG. 4A the straw may be conveniently stored and stocked for use in the same fashion as a regular straw. In the stored undeployed form, the straw apparatus of the invention will be 20% longer than a regular or plain straw to allow for return to the typical straw length after the straw is compressed into its mixing configuration. In FIG. 4A shown is the undeployed assembled second embodiment wherein the inner straw of FIG. 3A has been inserted into the outer straw of FIG. 3B and bonded at point 307. Shown is the bottom or proximal end of the inner straw 301, the top or distal end of the inner straw 302, the bottom or proximal end of the outer straw 303, the top or distal end of the outer straw 307, slit 308, top vein attachment point 306 at the end of the vein slits, bottom vein attachment point 304 at the end of the vein slits, and flexing or buckle point 305. The inner straw and the outer straw are bonded chemically, thermally, or mechanically at point 307. The undeployed straw apparatus of FIG. 4A can be deployed into the mixing configuration of FIG. 4B by compression, specifically by applying downward force to the end 302 of the undeployed straw assembly of FIG. 4A. Such application of force (i) causes the inner straw (FIG. 3A) to slide against the outer straw (FIG. 3B), and contemporaneously (ii) causes the veins, the margins of which are defined by the slits, to simultaneously separate from the body of the straw and buckle or bend at point 305. Although providing a mechanical crimp in a vein member at point 305 is a preferred method of inducing vein buckling, any means of weakening the vein so as to predispose buckling at this point may be used (i.e., perforation; thinning material, material properties, etc.). FIG. 4B shows the second embodiment straw apparatus in a deployed configuration having 4 deployed veins 309. After deployment, the bottom ends 301 and 303 of the inner and outer straws are co-located with shortening of the assembled straw apparatus. The suction capability of the straw apparatus is not compromised by the deployment of the mixing veins as the "bottoming out" of the bottom or proximal end 301 of the inner straw provides an intact sleeve or continuous column in the same direction of the flow of the drinking liquid.

Referring now to FIG. 5, there is shown a perspective view of the unassembled components of an undeployed third embodiment of the invention. As with all embodiments of this invention, this third embodiment has two components or members that are assembled into a functional straw apparatus of the invention. FIG. 5A is an inner straw that is the first member of this embodiment and FIG. 5B is an outer straw that is the second member of this embodiment. The inner straw of FIG. 5A is shorter than the outer straw of 5B and has a diameter that is slightly smaller than that of the outer straw in order that the inner straw and the outer straw may fit into one another and slide upon deployment. The inner straw is preferably about 40% the length of the outer straw, but may range between 20% and 60% of the length of the outer straw. The outer straw of FIG. 5B has a bottom or proximal end 503 and a top or distal end 507, and a plurality of longitudinal slits 508 in the straw that cut through or substantially penetrate the straw, two of which are illustrated, each of which begins at attachment point 506, at the top of slit 508 where the attachment point 506 is preferably about 60% of the distance from the top or distal end of the outer straw, and ends at attachment point 504 that is preferably about 85% of the distance from the distal end of the outer straw. Consistent with other configurations of the invention, two slits are required for each mixing vein appendage that will, when the two straws are assembled and when force is applied to the end 507 of the outer straw, allow the inner straw to slide downward within the outer straw and the veins of the outer straw (i) to separate from the assembled straw body along the slits by folding outward or deploying and (ii) to bend or buckle at point 505 located approximately at the mid-point of each vein. Upon deployment of the assembled two straw components, the veins deflect outward from attachment points 506 and 504. Each mixing vein 509 (shown deployed in FIG. 6B) is predisposed to bend or buckle outward at point 505 by virtue of a horizontal crease, crimp, perforation, material thinning, material properties or other treatment process across the vein 509 at point 505 to facilitate buckling. In this third embodiment, the structure and function of the stirring veins, the number of slits/vein, the spacing of slits, the nature of the slits, the number of veins, the formation of and location of the buckling point, the function of the attachment points, the differing straw diameters for sliding, and the size of the assembled embodiment, are as described with the first embodiment of FIGS. 1 and 2. The inner straw of FIG. 5A has a proximal or bottom end 501 and a distal or top end 502 and a diameter slightly less than the diameter of the outer straw of FIG. 5B so that it may conveniently fit into outer straw FIG. 5B and slide upon deployment. To form a single undeployed straw apparatus the inner straw FIG. 5A is inserted into the outer straw 5B as illustrated in FIG. 6. The straws are bonded, either chemically, thermally, or mechanically at point 502 as shown in the FIG. 6 assembly.

Referring now to FIG. 6, shown is a perspective drawing of the assembled components of the third embodiment illustrated in FIG. 5 (i.e., the outer straw of FIG. 5B bonded with inner straw of FIG. 5A at point 502). FIG. 6A is the undeployed structure of this third embodiment and FIG. 6B is the deployed configuration of this embodiment. In the assembled undeployed form of FIG. 6A the straw may be conveniently stored and stocked for use in the same fashion as a regular straw. In the stored undeployed form, the straw apparatus of the invention will be about 20% longer than the length of a regular straw to allow for return to the typical straw length after the straw is deployed into its mixing configuration. In FIG. 6A shown is the undeployed assembled third embodiment wherein the inner straw of FIG. 5A has been inserted into the outer straw of FIG. 5B and bonded at point 502. Shown is the bottom or proximal end of the inner straw 501, the top or distal end of the inner straw 502, the bottom or proximal end of the outer straw 503, the top or distal end of the outer straw 507, slit 508, top vein attachment point 506 at the end of the vein slits, bottom vein attachment point 504 at the end of the vein slits, and flexing or buckle point 505. The inner straw and the outer straw are bonded chemically, thermally, or mechanically at point 502. The undeployed straw apparatus of FIG. 6A can be deployed into the mixing configuration of FIG. 6B by compression, specifically by applying downward force to the end 507 of the undeployed straw assembly of FIG. 6A. Such application of force (i) causes the inner straw (FIG. 5A) to slide downward within the outer straw (FIG. 5B), and contemporaneously (ii) causes the veins, the margins of which are defined by the slits, to simultaneously separate from the body of the straw and buckle or bend at point 505. Although providing a mechanical crimp in a vein member at point 505 is a preferred method of inducing vein buckling, any means of weakening the vein so as to predispose buckling the mid point of a vein may be used (i.e., perforation; material thinning, material properties, etc.). FIG. 6B shows the third embodiment straw apparatus in a deployed configuration having 4 deployed veins 509. After deployment, the bottom ends 501 and 503 of the inner and outer straws are co-located with shortening of the assembled straw apparatus. The suction capability of the straw apparatus is not compromised by the deployment of the mixing veins as the "bottoming out" of the bottom or proximal end 501 of the inner straw provides an intact sleeve or continuous column in the same direction of the flow of the drinking liquid.

Figure 7:
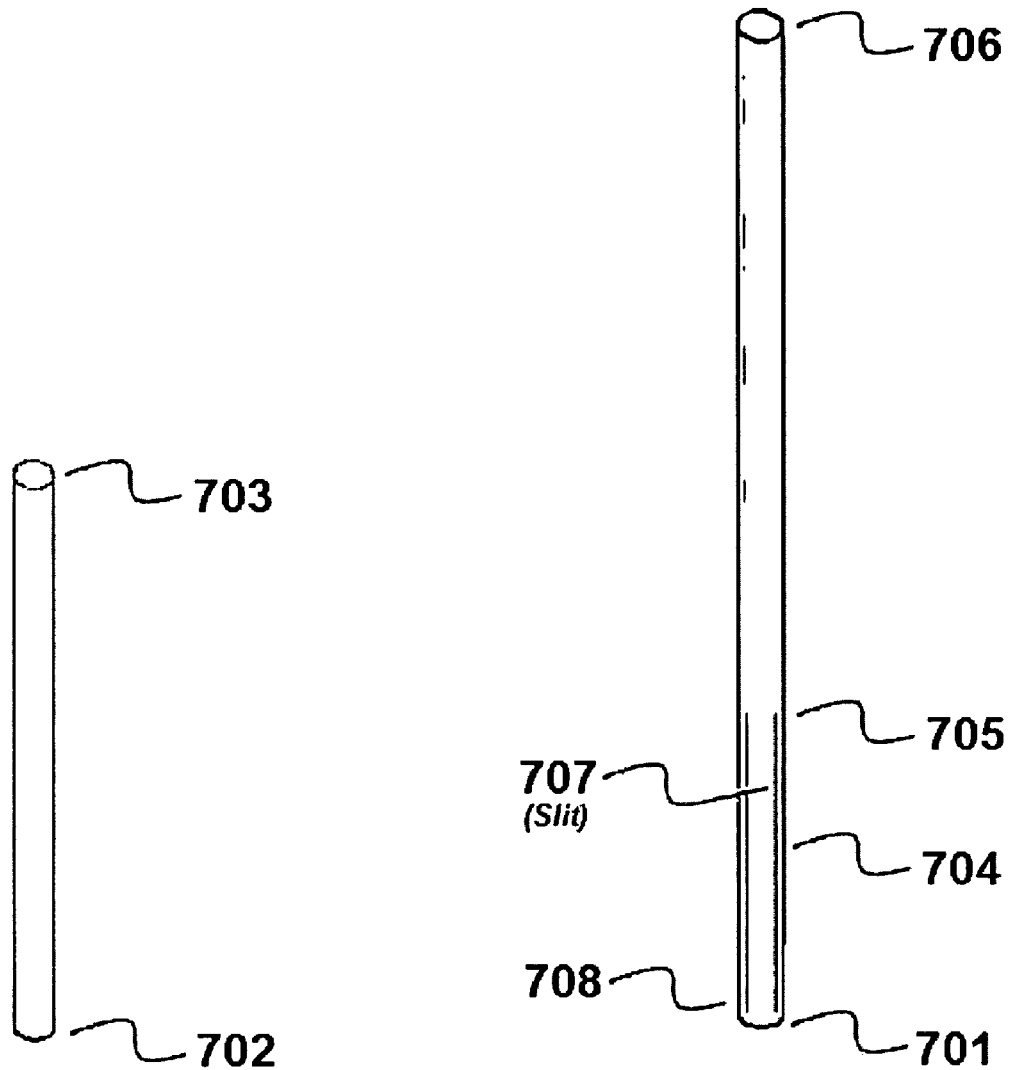
FIG. 7 is a perspective view of the unassembled components of an undeployed fourth embodiment of the invention.

Referring now to FIG. 7, there is shown a perspective view of the unassembled components of two undeployed members of a fourth embodiment of the invention that upon assembly provide a functional straw apparatus of the invention. FIG. 7A is an inner straw that is the first member of this embodiment and FIG. 7B is an outer straw that is the second member of this embodiment. The inner straw of FIG. 7A is shorter than the outer straw of 7B and has a diameter that is slightly smaller than that of the outer straw in order that the inner straw and the outer straw may fit tightly into one another and slide upon deployment. The inner straw FIG. 7A is preferably about 35% the length of the outer straw FIG. 7B, but may range between 15% and 55% of the length of the outer straw. The outer straw of FIG. 7B has a bottom or proximal end 701 and a top or distal end 706; and a plurality of longitudinal slits 707 in the straw that cut through or substantially penetrate the straw, two of which are illustrated. Each slit 707 begins at attachment point 705 and ends at attachment point 708. The attachment point 705 is preferably about 75% of the distance from the top or distal end of the outer straw 706, and ends at attachment point 708 that is preferably about 96-99% of the distance from the distal end of the outer straw. Consistent with other configurations of the invention, two slits are required for each mixing vein appendage that will, when the two straws are assembled and when force is applied to the end 706 of the outer straw (i.e., axially through point 701 and 702 of the apparatus), (i) allow the inner straw to slide into the outer straw and (ii) allow the veins of the outer straw to separate from the assembled straw body along the slits by folding outward or deploying and simultaneously bending or buckling at point 704 located approximately at the mid-point of each vein. Upon deployment of the assembled two straw components, the veins deflect outward from attachment points 705 and 708. Each mixing vein 709 (shown deployed in FIG. 6B) is predisposed to bend or buckle outward at point 704 by virtue of a horizontal crease, crimp, perforation, material thinning, material properties or other treatment process across the vein 709 at point 704 to facilitate buckling. In this fourth embodiment, the structure and function of the stirring veins, the number of slits/vein, the spacing of slits, the nature of the slits, the number of veins, the formation of and location of the buckling point, the function of the attachment points, the differing straw diameters for sliding, and the size of the assembled undeployed embodiment (i.e., about 20% longer than a conventional drinking straw to allow for loss of length following compression and deployment of the stirring veins), are as described with the first embodiment of FIGS. 1 and 2. The inner straw of FIG. 7A has a proximal or bottom end 702 and a distal or top end 703 and a diameter slightly less than the diameter of the outer straw of FIG. 7B so that it may conveniently fit tightly into outer straw FIG. 7B and slide upon deployment. To form a single undeployed straw apparatus the inner straw FIG. 7A is inserted into the outer straw 7B as illustrated in FIG. 8A. The straws are bonded, either chemically, thermally, or mechanically at points 701 and 702.

Referring now to FIG. 8, shown is a perspective drawing of the assembled components of the fourth embodiment illustrated in FIG. 7 (i.e., the outer straw of FIG. 7B bonded with inner straw of FIG. 7A at points 701 and 702). The structure and function of this fourth embodiment is similar to the first embodiment (c.f., FIGS. 1 & 2) except for the location of the slits/veins that are closer to the bottom of the straw apparatus in the fourth embodiment than they are in the first embodiment. FIG. 8A is the undeployed structure of this fourth embodiment and FIG. 8B is the deployed configuration of this embodiment. In the assembled undeployed form of FIG. 8A the straw may be conveniently stored and stocked for use in the same fashion as a regular straw. In the stored undeployed form, the straw apparatus of the invention will be about 20% longer than the length of a regular straw to allow for return to the typical straw length after the straw is deployed into its mixing configuration. In FIG. 8A shown is the undeployed assembled fourth embodiment wherein the inner straw of FIG. 7A has been inserted into the outer straw of FIG. 7B and bonded at points 701 and 702. Shown is the bottom or proximal end of the inner straw 702, the top or distal end of the inner straw 703, the bottom or proximal end of the outer straw 701, the top or distal end of the outer straw 706, slit 707, top vein attachment point 705 at the end of the vein slits, bottom vein attachment point 708 at the end of the vein slits, and flexing or buckle point 704. In order to form a single one piece apparatus, the inner straw and the outer straw are bonded chemically, thermally, or mechanically at points 701 and 702. The undeployed straw apparatus of FIG. 8A can conveniently be deployed into the mixing configuration of FIG. 8B by compression, specifically by applying downward force to the end 706 of the undeployed straw assembly of FIG. 8A. Such application of force (i) causes the inner straw (FIG. 8A) to slide within the outer straw (FIG. 8B), and contemporaneously (ii) causes the veins, the margins of which are defined by the slits, to simultaneously separate from the body of the straw and buckle or bend at point 704. The mixing veins are preconditioned to bend or buckle outward at point 704. Preconditioning of veins to buckle or bend outward at their midpoints is effected by means of weakening the vein so as to predispose buckling (i.e., perforation; thinning material, material properties, etc.). FIG. 8B shows the fourth embodiment straw apparatus in a deployed configuration having 4 deployed veins 709. The suction capability of the straw apparatus is not compromised by the deployment of the mixing veins as the friction of the surface area from point 703 to point 705 provides an intact sleeve or continuous column in the same direction of the flow of the drinking liquid.

Referring now to FIG. 9, there is shown a perspective view of the unassembled components of two undeployed members of a fifth embodiment of the invention that upon assembly provide a functional drinking and stirring straw apparatus of the invention. FIG. 9A is an inner straw that is the first member of this embodiment and FIG. 9B is an outer straw that is the second member of this embodiment. The inner straw of FIG. 9A is longer than the outer straw of 9B and has a diameter that is slightly smaller than that of the outer straw in order that the inner straw and the outer straw may fit tightly into one another and slide upon deployment. The outer straw FIG. 9B is preferably about 45% the length of the inner straw FIG. 9A but may range between 25% and 50% of the length of the inner straw. The outer straw of FIG. 9B has a bottom or proximal end 901 and a top or distal end 903; and a plurality of longitudinal slits 911 in the straw that cut through or substantially penetrate the straw, two of which are illustrated. Each slit 911 begins at attachment point 907 and ends at attachment point 909. The slit attachment point 907 (when the 2 straws are assembled but undeployed) is preferably about 65% to 85% of the distance from the top or distal end of the longer inner straw 904, and ends at attachment point 909 that is preferably about 96% to 99% of the distance from the distal end of the inner straw. The inner straw FIG. 9A has a compressible accordion section 910. Consistent with other configurations of the invention, two slits are required for each mixing vein appendage that will, when the two straws are assembled and when force sufficient for compression is applied to the end 904 of the inner straw (i.e., axially through points 901 and 902 of the assembled straw apparatus with straw components bonded at points 903 and at co-located points 901 & 902), (i) compress the accordion section of inner straw FIG. 9A allow the inner straw to slide into the outer straw and (ii) allow the veins of outer straw FIG. 9B to separate from the assembled straw body along the slits by folding outward or deploying and to bend or buckle at point 908 located approximately at the mid-point of each vein. Upon deployment of the assembled two straw components, the veins deflect outward from attachment points 907 and 909. Each mixing vein 912 (shown deployed in FIG. 10B) is predisposed to bend or buckle outward at point 908 by virtue of a horizontal crease, crimp, perforation, material thinning, material properties or other treatment process across the vein 912 at point 908 to facilitate buckling. In this fifth embodiment, the structure and function of the stirring veins, the number of slits/vein, the spacing of slits, the nature of the slits, the number of veins, the formation of and location of the buckling point, the function of the attachment points, the differing straw diameters for sliding, and the size of the assembled undeployed embodiment (i.e., about 20% longer than a conventional drinking straw to allow for loss of length following compression and deployment of the stirring veins), are as earlier described. The inner straw of FIG. 9A has a proximal or bottom end 902 and a distal or top end 904 and a diameter slightly less than the diameter of the outer straw of FIG. 9B so that it may conveniently fit into outer straw FIG. 9B and slide upon deployment. To form a single undeployed straw apparatus the inner straw FIG. 9A is inserted into the outer straw 9B as illustrated in FIG. 10. The straws are bonded, either chemically, thermally, or mechanically at points 903 and at co-located points 901 & 902.

Referring now to FIG. 10, shown is a perspective drawing of the assembled components of the fifth embodiment illustrated in FIG. 9 (i.e., the outer straw of FIG. 9B bonded with inner straw of FIG. 9A at points 903 and at co-located points 901 & 902). The structure and function of this fifth embodiment is similar to the third embodiment (c.f., FIGS. 5 & 6) in that the outer straw is shorter than the inner straw that has slits cut into it for production of the stirring veins that compress and are outwardly displaced in the deployment process. FIG. 10A is the undeployed structure of this fifth embodiment and FIG. 10B is the deployed configuration of this embodiment. In the assembled undeployed form of FIG. 10A the straw may be conveniently stored and stocked for use in the same fashion as a regular straw. In the stored undeployed form, the straw apparatus of the invention will be about 20% longer than a regular or plain straw to allow for return to the typical straw length after the straw is compressed into its mixing configuration. When force is applied the accordion section of the straw 910 (defined from point 905 to point 906) simultaneously deploys the mixing veins. In FIG. 10A shown is the undeployed assembled fifth embodiment wherein the inner straw of FIG. 9A has been inserted into the outer straw of FIG. 9B and bonded at points 903 and at co-located points 901 & 902. Shown is the bottom or proximal end of the inner straw 902, the top or distal end of the inner straw 904, the bottom or proximal end of the outer straw 901, the top or distal end of the outer straw 903, slit 911, top vein attachment point 907 at the end of the vein slits, bottom vein attachment point 909 at the end of the vein slits, and flexing or buckle point 908. In order to form a single one piece apparatus, the inner straw and the outer straw are bonded chemically, thermally, or mechanically at points 903 and at co-located points 901 & 902. The undeployed straw apparatus of FIG. 10A can conveniently be deployed into the mixing configuration of FIG. 10B by compression, specifically by applying downward force to the end 904 of the undeployed straw assembly of FIG. 10A. This compression will continue with the veins bending until points 905 and 906 of the accordion section 910 can no longer be compressed due to the nature of the accordion design. The "bottoming out" of the accordion section will stop the deployment process, with the apparatus maintaining its shape of FIG. 10B due to material properties and the geometrically static design of the compressed accordion feature. Such application of compression force (i) causes the inner straw (FIG. 9A) to slide within the outer straw (FIG. 9B), thereby compressing the accordion section 910 of the inner straw that stops and locks into the outer straw; and (ii) causes the veins, the margins of which are defined by the slits, to simultaneously separate from the body of the straw and buckle or bend at point 908. The mixing veins are preconditioned to bend or buckle outward at point 908. Preconditioning of veins to buckle or bend outward at their midpoints is effected by means of weakening the vein so as to predispose buckling (i.e., perforation; thinning material, material properties, etc.). FIG. 10B shows the fifth embodiment straw apparatus in a deployed configuration having 4 deployed veins 912. Upon deployment, the bottom ends 901 and 902 of the inner and outer straws are co-located with shortening of the assembled straw apparatus equivalent to the distance lost from compression of the accordion section 910 of the inner straw. The suction capability of the straw apparatus is not compromised by the compression of the accordion section 910 and deployment of the mixing veins 912 as the deployed straw apparatus provides an intact sleeve or continuous column in the same direction of the flow of the drinking liquid. Once the apparatus has been put into its folded-out or deployed configuration, it has dual functionality as both a straw and a mixing device. The suction of the straw is preserved by the folding-out deployment simply because the inner straw now acts as one continuous unit from 904 to co-located points 901 & 902 and does not depend on the outer straw to maintain suction.

Referring now to FIG. 11, there is shown a perspective view of the unassembled components of an undeployed sixth embodiment of the invention. As with the first embodiment of the invention illustrated in FIGS. 1 and 2, this sixth embodiment also has two components or members that are assembled into the functional straw apparatus of the invention. FIG. 11A is an inner straw that is the first member and FIG. 11B is an outer straw that is the second member of this embodiment. The inner straw of FIG. 11A represents an unaltered typical drinking straw which is generally from about 100 mm to about 400 mm in length, and preferably from about 200 mm to about 300 mm in length. The outer straw of FIG. 11B and has a diameter that is slightly larger than that of the inner straw in order that the inner straw may be inserted into the outer straw to form the assembled undeployed configuration. The outer straw is preferably about 40% the length of the inner straw, but may range between 20% and 60% of the length of the inner straw. The outer straw of FIG. 11B has a bottom or proximal end 1105 and a top or distal end 1104, and a plurality of longitudinal slits in the straw that cut through or substantially penetrate the straw, two of which are illustrated. Each slit 1107 begins at attachment point 1106, which is preferably about 10% of the distance from the top or distal end of the outer straw, and ends at attachment point 1109 that is preferably about 99% of the distance from the distal end of the outer straw. The outer straw of FIG. 11B differs from all other outer straw embodiments specified here in, in that the internal configuration of the FIG. 11B involves the extrusion of the outer straw in such a way that it is turned over itself or pulled through itself. To clarify this design description FIG. 11C shows a longitudinal mid-line cross section of the unassembled components of FIG. 11B. The outer straw cross section of FIG. 11C shows a top or distal end 1104, a the bottom or proximal end 1105 which simultaneously acts as a crease for the outer straw and the internally extruded outer straw member which has a top or distal end 1110, and a detent 1103 introduced into the outer straw such that it stops the travel of the inserted inner straw. As with all configurations of the invention, two slits are required for each mixing vein appendage that will, in this configuration, when the two straws are assembled and when force is applied to the end 1101 of the inner straw, allow the veins of the outer straw (i) to separate from the assembled straw body along the slits by folding outward or deploying and (ii) to bend or buckle at point 1108 located approximately at the mid-point of each vein. The veins deflect outward from attachment points 1106 and 1109. Each mixing vein is predisposed to bend or buckle outward at point 1108 by virtue of a horizontal crease, crimp, perforation, material thinning, material properties or other treatment process across the vein at point 1108 to facilitate buckling. In this sixth embodiment, the structure and function of the stirring veins, the number of slits/vein, the spacing of slits, the nature of the slits, the number of veins, the formation of and location of the buckling point, the function of the attachment points, and the differing straw diameters, are as described with the first embodiment of FIGS. 1 and 2. The inner straw of FIG. 11A has a proximal or bottom end 1102 and a distal or top end 1101 and a diameter slightly less than the diameter of the outer straw of FIG. 11B so that it may conveniently fit into the outer straw of FIG. 11B. The outer straw of FIG. 11B, in this sixth embodiment, acts like an accessory component that upon insertion with FIG. 11A forms a single undeployed straw apparatus as illustrated in FIG. 12.

Figure 12:
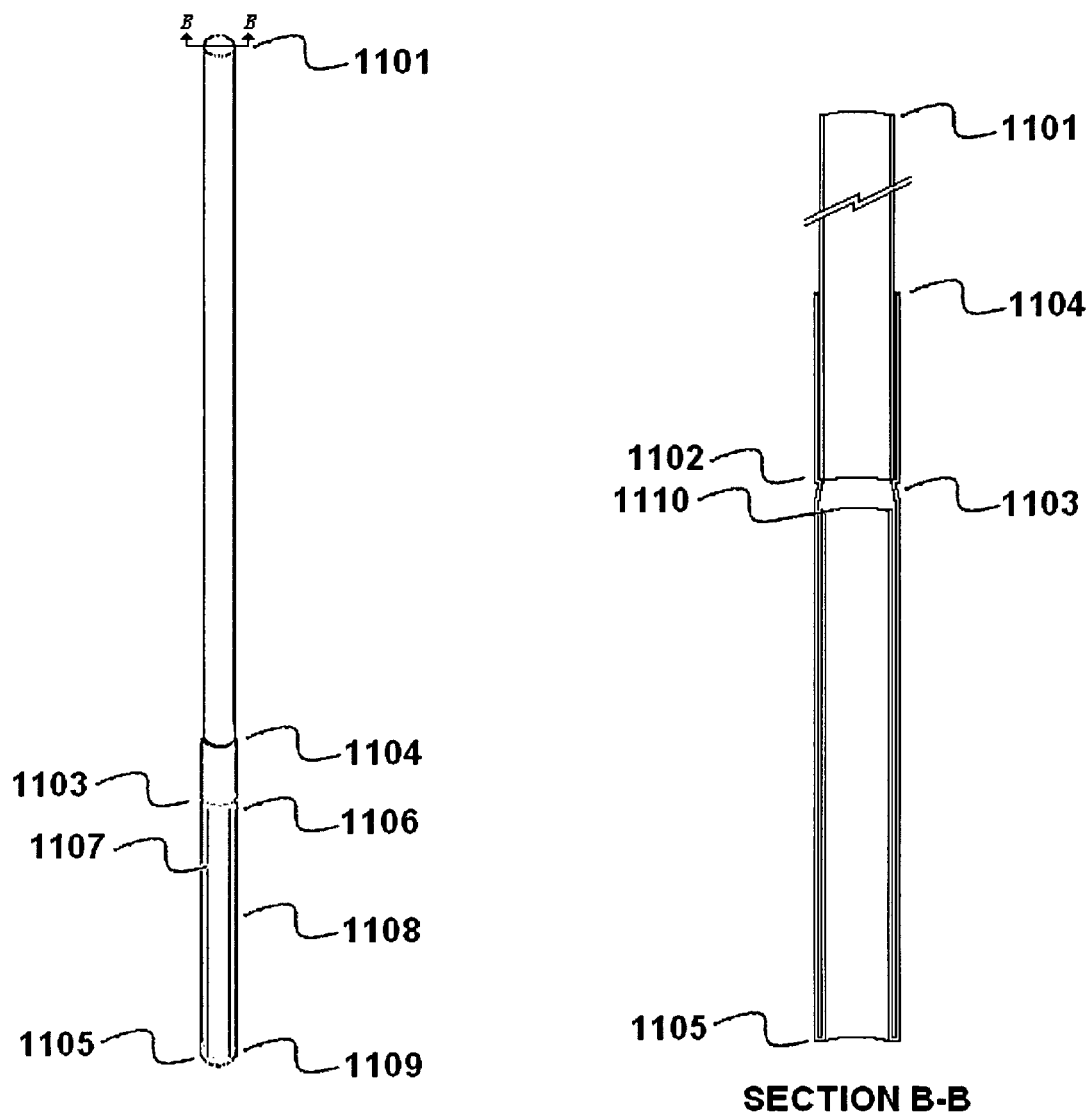
FIG. 12 is a perspective view of the assembled members of the embodiment of FIG. 11.

Referring now to FIG. 12, shown is a perspective drawing of the assembled components of the sixth embodiment illustrated in FIG. 12 (i.e., the inner straw of FIG. 11A inserted into the outer straw of FIG. 11B). FIG. 12A is the undeployed structure of this sixth embodiment and FIG. 12C is the deployed form of this embodiment. FIG. 12B and FIG. 12D respectively show cross sections of the assembled components in FIG. 12A and FIG. 12C to clarify the design description. In the undeployed form, the straw apparatus of the invention will be 40% longer than a regular or plain straw to allow for return to the typical straw length after the straw is compressed into its mixing configuration. In FIG. 12A shown is the undeployed assembled sixth embodiment wherein the inner straw of FIG. 11A has been inserted into the outer straw of FIG. 11B. Shown is the top or distal end of the inner straw 1101, the bottom or proximal end of the outer straw 1105, the top or distal end of the outer straw 1104, detent 1110, slit 1107, top vein attachment point 1106 at the end of the vein slits, bottom vein attachment point 1109 at the end of the vein slits, and flexing or buckle point 1108. To clarify this design description FIG. 12B is a cross section of the assembled components of FIG. 12A. FIG. 12B shows the top or distal end 1101 of the inner straw, the bottom or proximal end 1102 of the inner straw, the top or distal end 1104 of the outer straw, the bottom or proximal end 1105 of the outer straw which simultaneously acts as a crease for both the outer straw and the internally extruded outer straw member which has a top or distal end 1110. Upon insertion into the outer straw, the inner straw "bottoms out" at detent 1103 which acts like a physical discontinuity that stops the travel of the inner straw. The undeployed straw apparatus of FIG. 12A can be deployed into the mixing configuration of FIG. 12C by compression, specifically by applying downward force to the end 1101 of the undeployed straw assembly of FIG. 12A. Such application of force (i) causes the inner straw (FIG. 11A) to "bottoms out" at detent 1103, and contemporaneously (ii) causes the veins, the margins of which are defined by the slits, to simultaneously separate from the body of the straw and buckle or bend at point 1108. Although providing a mechanical crimp in a vein member at point 1108 is a preferred method of inducing vein buckling, any means of weakening the vein so as to predispose buckling at this point may be used (i.e., perforation; thinning material, material properties etc.). FIG. 12C shows the second embodiment straw apparatus in a deployed configuration having 4 deployed veins 111. To clarify the design description, FIG. 12D shows a cross section of the assembled deployed components of FIG. 12C. The deployed straw cross section of FIG. 12D shows a top or distal end 1101 of the inner straw, the bottom or proximal end 1102 of the inner straw, a top or distal end 1104 of the outer straw, a the bottom or proximal end 1105 of the outer straw which simultaneously acts as a crease for both the outer straw and the internally extruded outer straw member which has a top or distal end 1110, and a detent 1103. The suction capability of the straw apparatus is not compromised by the deployment of the mixing veins as the friction of the surface area from point 1104 to point 1103, incurred by the "bottoming out" of the bottom or proximal end 1102 of the inner straw coupled with the penetration upon deployment of 1110 of the outer straw into the inner straw provides an intact sleeve or continuous column in the same direction of the flow of the drinking liquid that do not compromise the suction functionality of the straw apparatus.

Figure 13:
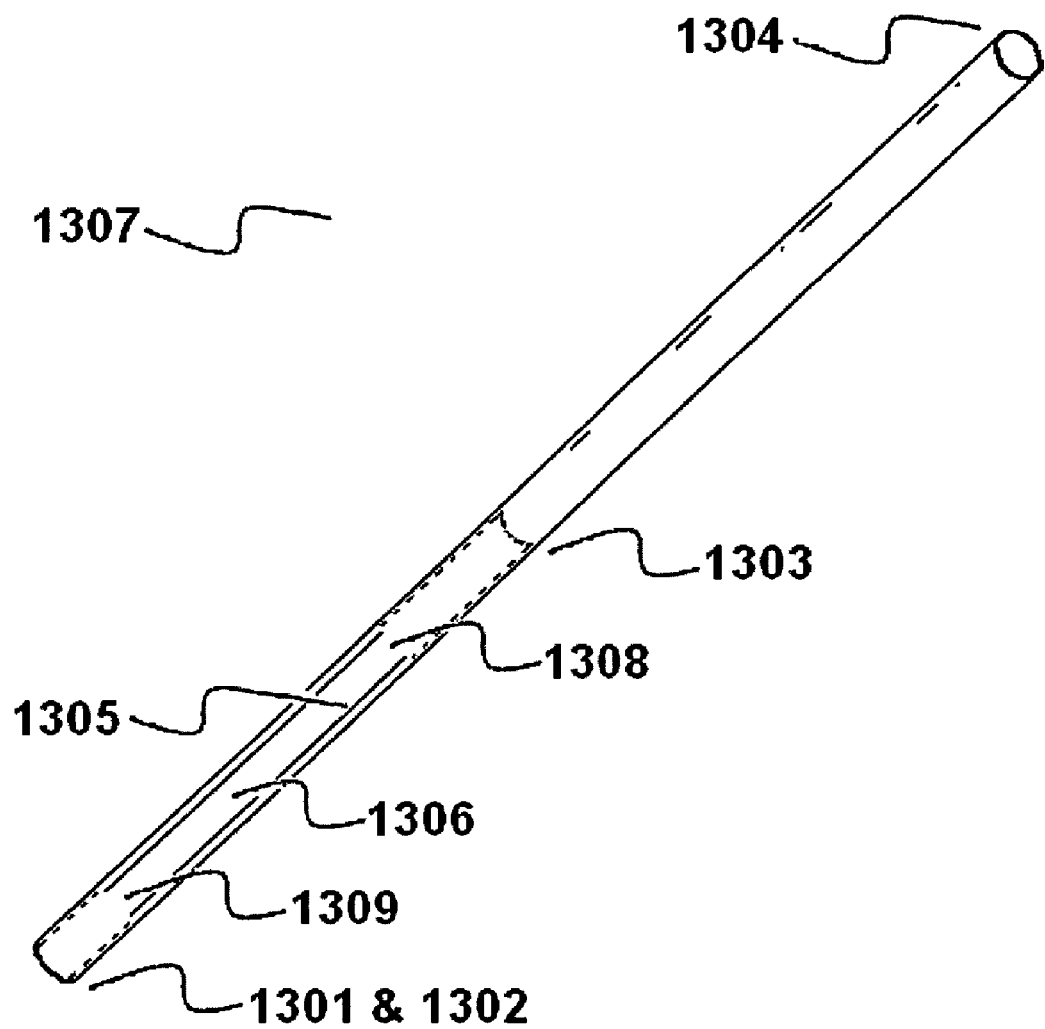
FIG. 13 is a perspective view of an assembled undeployed general model of the straw apparatus of the invention.

Generic Straw Apparatus Design. Referring now to FIG. 13, shown is a perspective view of an assembled undeployed generic model of the straw apparatus of the invention 1307. Generally, the straw apparatus of the invention has two structural sub-components (i.e., and inner straw and an outer straw) and two configurations (i.e., undeployed and deployed). In its deployed configuration, the straw apparatus provides both drinking and stirring functions. In its undeployed configuration, the straw apparatus looks, stores, packages, and performs drinking functions like a conventional straw. In its deployed configuration, mixing veined structures are provided that can mix or churn, as may be required, any liquid, gel, or semi-solid drinking formulation (i.e., liquid solution, mixture, emulsion, suspension and the like). Many of the various commercial formulations of hot and cold drinks, especially cold drinks, that are typically consumed with a straw require mixing, especially if the drink has a high viscosity, has ingredients that are prone to separation, or contains crushed ice or frozen components that are advantageously mixed. Examples of such commercial drinks include, but are not limited to, smoothies, slushies, and mixed alcoholic beverages with ice cubes, milk shakes, and the like. Having a dual-function straw apparatus that provides both drinking and mixing capabilities obviates the need for a separate straw and stirring (i.e., a spoon) structures. As described and illustrated herein, the straw apparatus of the invention can be constructed in various configurations, each of which has the following design features: (i) two subcomponents straw structures that fit into each other (or one straw component that can be manipulated by manufacturing to produce this apparatus as one piece); (ii) one of the subcomponent straws is longer than the other; (iii) one of the straw subcomponents has slits or cuts that define mixing vein structures; (iv) the straws are bonded at one or more locations providing unit integrity; (v) the vein structures are predisposed to bend outwardly at their midpoint when appropriate force is applied during deployment; (vi) a plurality of veins are provided [i.e., preferably 2-6]; and (vii) there is a means to stop the process of deployment.

Shown in the assembled undeployed two-straw subcomponent apparatus of FIG. 13, is a bottom or proximal end of an inner shorter straw 1302 and its top or distal end 1303; a bottom or proximal end of an outer longer straw 1301 and its top or distal end 1304; a vein slit of the outer straw 1305 (two slits define a single vein; a plurality of veins are provided with each straw apparatus); the vein bending or buckling point 1306; vein attachment points 1308 and 1309. The subcomponent straws are bonded at their bottom points 1301 and 1302 or other embodiment-specific locations that provide structural integrity for mixing vein deployment and drinking purposes.

Figure 14:
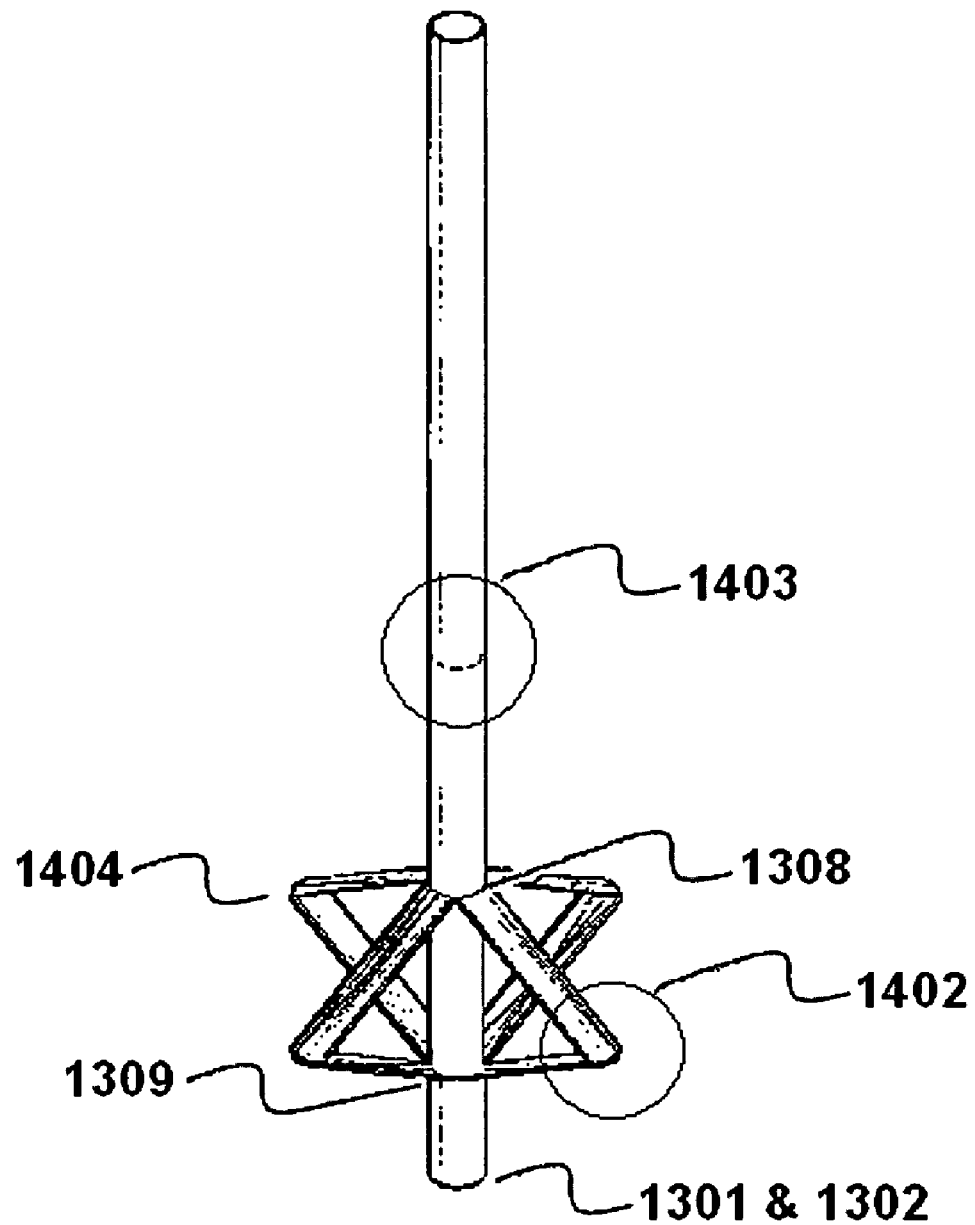
FIG. 14 is a perspective view of the deployed general model of FIG. 13.

Referring now to FIG. 14, shown is a perspective view of a deployed general model 1401 of FIG. 13. The deployed apparatus has a straw subcomponents sliding and intersection area 1403, a vein 1404 with attachment points 1308 and 1309, common subcomponents bottom ends 1301 and 1302, and a mixing vein flexing or bending point 1402. As described herein, there are several alternative means to induce the veins to bend at a particular point, there are several alternative means to stop the mixing vein deployment process, and there are several means to bond or pin the two straw subcomponents of the straw apparatus.

An alternate method of manufacturing can be used for the first, fourth, fifth, and sixth embodiments herein eliminating the need for an apparatus comprising of two bonded straw subunits. These embodiments (specifically the relative undeployed and deployed configurations c.f., FIGS. 1, 2, 7, 8, 9 and 10), all begin with two straw subunits which are bonded, either chemically, thermally, or mechanically at co-located bottoms or proximal ends, producing a single apparatus. The need for bonding at relative co-located bottoms or proximal ends can be totally eliminated by simply fabricating the straw apparatus as one piece. This fabrication involves a manufacturing process where a single straw can be extruded in such a way that it is turned over itself or pulled through itself. In other words, the thermal properties of the straw can be manipulated to a point where the straw is in a pliable state, where the same straw can be extruded by internal or external means to an point along its longitudinal axis, producing inner and outer members respectively. This, in turn, eliminates the need for bonding at the co-located bottoms resulting in a unibody design. As a result, the apparatus is manufactured as a continuous column, as opposed to two sub units that need to be bonded.

Inducement of Mixing Vein Bending. Referring now to FIG. 15, shown is an illustrated representation of various means of inducing bending points of veins in embodiments of the apparatus of the invention; FIG. 15A illustrates crimping means, FIG. 15B illustrates perforation means; and FIG. 15C illustrates thinning means. Any of these means, or equivalents thereof, or combinations thereof, may be employed to induce mixing vein bending in the deployed configuration of the straw apparatus of the invention.

In all embodiments of the straw apparatus of the invention, the bending of the veins is required in order to transform undeployed configurations into deployed configurations thus providing structures for efficient mixing and drinking of beverages. It is understood that, depending on the application, the bending of mixing veins can be induced at any point or combination of points in the veins. A vein mid-point would create an isosceles triangle with the base on the axle of the straw. This mid-point vein bending point as a preferred location was illustrated for convenience in figures of various embodiments, but the invention is not limited to vein midpoint bending or flexing. Other suitable vein bending points can be chosen to create various angles, including but not limited to angles that are perpendicular to the vertical axis of the straw at either the top or bottom of the veins. Placing the point either further up or down the vertical axis of the straw would create an overextension or a greater than 90 degree angle with the vertical axis of the straw on either the top or the bottom. Furthermore, a combination could be used, producing different angles for each of the veins. Also, a plurality of bends in the veins and/or multilevel radially expandable vein members/bends could be employed to produce various vein designs.

FIG. 15A illustrates a mechanical crimp means 1501 for inducing outward bending of a mixing vein; FIG. 15B illustrates a vein perforation means 1502 for inducing vein bending; and FIG. 15C illustrated a thinning of the walls of a vein 1503 for inducing a vein bending or buckling point. Any combination of these bending or buckling means or their equivalents may be employed in the fabrication of embodiments of the invention.

Termination of Straw Vein Deployment. Referring now to FIG. 16, illustrated are various means of terminating deployment of veins of the straw apparatus of the invention; FIG. 16A illustrates friction means; FIG. 16B illustrates notching means; FIG. 16C illustrates tapering means; and FIG. 16D illustrates detent means. FIG. 16E illustrates harmonic compression means. Any of these means of stopping or terminating deployment of veins, or combinations thereof, or equivalents thereof, may be used in the fabrication of embodiments of the invention.

In all configurations of the straw apparatus of the invention, it is necessary to stop the process of deployment. In the second, third, fifth embodiments, illustrated in FIGS. 3, 4, 5, 6, 9 and 10, the deployment is stopped by virtue of its design. In the second embodiment, the two lower points of the of the two straw subcomponents (c.f., FIGS. 3 & 4, points 301 and 303) align when they are both in contact with the fixed surface that the device is being pushed against. In the third embodiment, the two lower points of the of the two straw subcomponents (c.f., FIGS. 5 & 6, points 501 and 503) align when they are both in contact with the fixed surface that the device is being pushed against. In the fifth embodiment, the stop occurs due to material properties and the geometrically static design of the compressed accordion feature (c.f., FIGS. 9 & 10, point 910). In the remaining embodiments (c.f., FIGS. 1, 2, 7, 8, 11 and 12), where one straw is sliding against the other, a means of stopping is required. Various means can be used to accomplish this stop function, several of which are illustrated and described herein below, but any suitable means, or combination of means, of stopping the deployment process of the straw apparatus of the invention can be used and the invention is not limited to the illustrated stop means.

FIG. 16A illustrates a means of stopping deployment relying on friction 1601. In this instance, as one straw subcomponent slides further into the other straw subcomponent, the increased area of surface contact will make it increasingly harder to move thus creating a natural stop. While it may be possible to over deploy an embodiment relying on friction, a typical user will stop when the friction reaches the point that it "feels" as though the process is complete.

FIG. 16B illustrates a means of stopping deployment relying on notching 1602. Notching can be conveniently used as a stop means. With notching, the concept is to make the geometry of the straw such that the outer diameter of the inner straw will come to point where the inner diameter of the outer straw becomes dramatically smaller making it impossible to continue travel.

FIG. 16C illustrates a means of stopping deployment relying on tapering 1603. Tapering is similar to the notching concept, but the inner diameter of the outer straw will not be reduced as dramatically as with notching; this may be advantageous for manufacturing reasons.

FIG. 16D illustrates a means of stopping deployment relying on a detent. 1604. With a detent, a physical discontinuity is introduced into the outer straw such that it stops the travel of the inner straw. This will be one or several mechanical or thermal indents into the straw.

FIG. 16E illustrates a means of stopping deployment relying on harmonic compression 1605. With harmonic compression, the accordion section of the straw is compressed to the point that it has fully minimized preventing further translation along the vertical axis.

Although the present invention describes in detail certain embodiments, it is understood that variation and modifications exist known to those skilled in the art that are within the invention. Accordingly, the present invention is intended to encompass all such alternatives, modifications and variation that are within the scope of the invention as set forth in the following claims.

Referring now to FIGS. 17 to 23, various cross section of straws of the apparatus of the invention are illustrated. In FIG. 17, 1701 is a circular cross section; 1702 is a square cross section; 1704 is a hexagon cross section; and 1703 is an octagon cross section.

Figure 18:
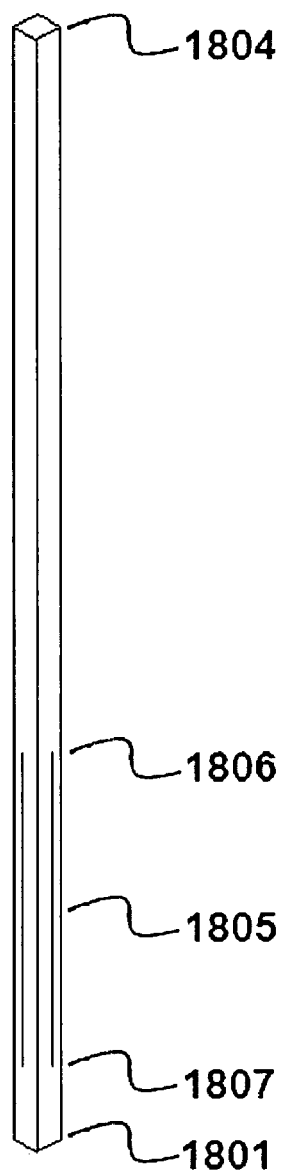
FIG. 18 is a perspective drawing of the unassembled components of an undeployed first embodiment of the invention (cf., FIG. 1) having straws with square cross sections.
Figure 18:
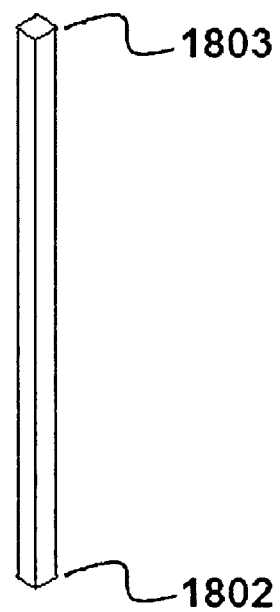

In the square cross section straws of FIG. 18, the outer straw has a bottom end 1801 and a top end 1804. Each slit has attachment points (1806; 1807) and a bend or buckle point 1805. The inner straw has an upper end 1803 and a lower end 1802.

In FIG. 19, the square cross section undeployed assembled straw apparatus of FIG. 19A and the deployed apparatus of FIG. 19B have a bottom end of the outer straw 1901 co-located with the bottom end of the inner straw 1902. Shown is the top end of the inner straw 1903, vein slits in the outer straw 1908 that run from upper hinge buckling point 1906 to lower hinge buckling point 1907. 1905 is the vein buckling point.

Figure 20:
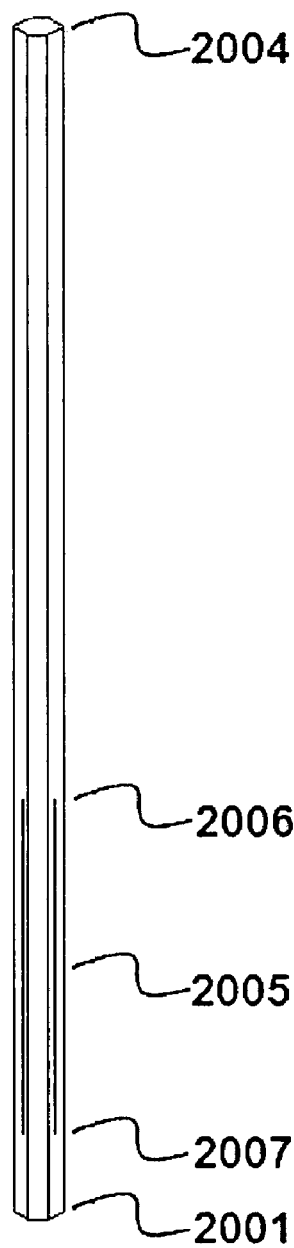
FIG. 20 is a perspective drawing of the unassembled components of an undeployed first embodiment of the invention (c.f., FIG. 1) having straws with hexagon cross sections.
Figure 20:
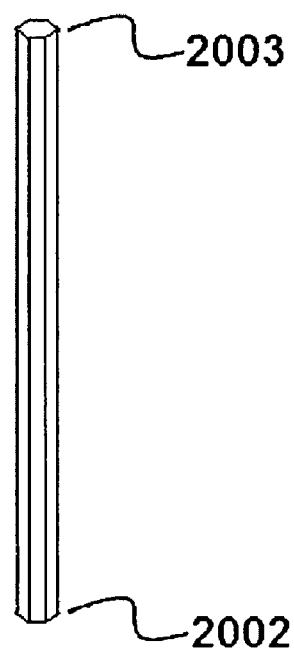

In FIG. 20, the hexagon cross section embodiment has an outer straw of FIG. 20A and a inner straw of FIG. 20B. The outer straw has an upper end 2004 and a lower end 2001 with veins composed of two slits having an upper hinge attachment point 2006 and a lower hinge attachment point 2070. The inner straw of FIG. 20B has an upper end 2003 and a lower end 2002.

In FIG. 21, the hexagon cross section undeployed assembled straw apparatus of FIG. 21A and the deployed apparatus of FIG. 21B have a bottom end of the outer straw 2101 co-located with the bottom end of the inner straw 2102. Shown is the top end of the inner straw 2103, vein slits in the outer straw 2108 that run from upper hinge buckling point 2106 to lower hinge buckling point 2107. 2105 is the vein buckling point.

In FIG. 22, the octagon cross section embodiment has an outer straw of FIG. 22A and a inner straw of FIG. 22 B. The outer straw has an upper end 2204 and a lower end 2201 with veins composed of two slits having an upper hinge vein attachment point 2206 and a lower hinge vein attachment point 2207. The inner straw of FIG. 20B has an upper end 2203 and a lower end 2202.

Figure 23:
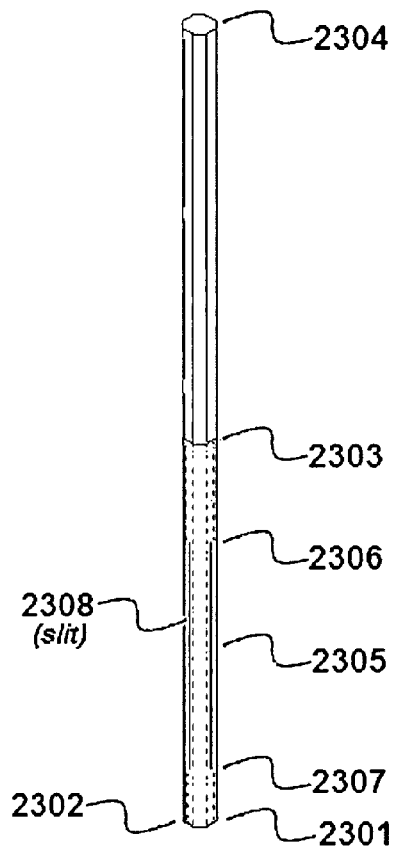
FIG. 23 is a perspective drawing of the assembled components of the of FIG. 22 having straws with octagon cross sections.
Figure 23:
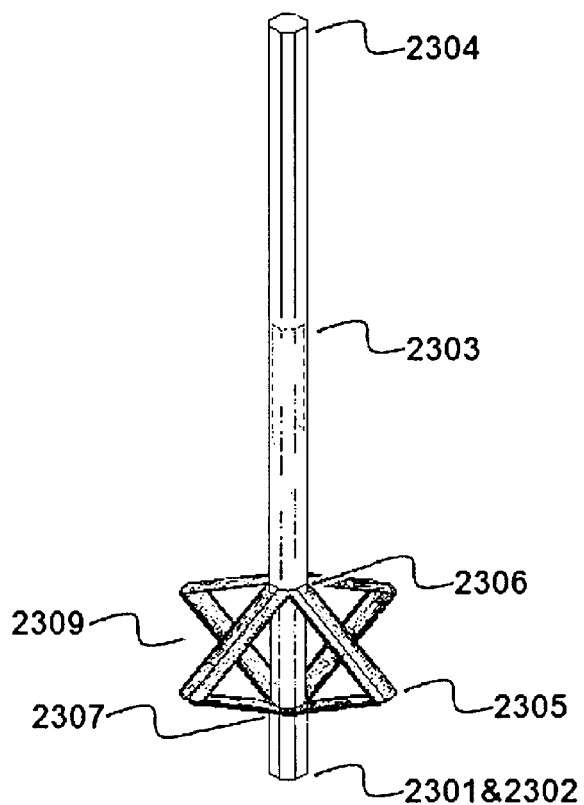

In FIG. 23, the octagon cross section undeployed assembled straw apparatus of FIG. 23A and the deployed apparatus of FIG. 23B have a bottom end of the outer straw 2301 co-located with the bottom end of the inner straw 2302. Shown is the top end of the inner straw 2303, vein slits in the outer straw 2308 that run from upper hinge buckling point 2306 to lower hinge buckling point 2307. 2305 is the vein buckling point.

What is claimed is:

1. An expandable drinking and mixing straw apparatus comprising:
    a outer first straw member having a first diameter, a first length, an upper end, a lower end, a plurality of radially expandable vein members orientated generally parallel to each other along its longitudinal axis wherein each of said vein members is:

(a) defined by two longitudinal slits; (b) has an upper hinge attachment means providing buckling rotatable about a fixed axis between the upper end of the longitudinal slits; (c) has a lower hinge attachment means providing buckling rotatable about a fixed axis between the lower end of said longitudinal slits (d) is connected to said outer first straw by said upper and lower hinge attachment means; and (e) has at least one means providing buckling between said upper and lower hinge attachment means; and a inner second straw member located internal to said outer first straw member having a second diameter smaller than said first diameter of said outer first straw member and, having a second length different from said first length of said outer first straw member, having an upper end, and a lower end and;

at least one bonding means between said outer first straw member and said inner second straw member and a means for stopping deployment of said radially expandable vein members at a predetermined position.

2. The straw apparatus of claim 1, wherein said outer first straw member and said inner second straw member are tubular, are square in cross section with rectangular sides, or consist of equal rectangular sides having a plurality of sides.

3. The straw apparatus of claim 1, wherein said outer first straw member and said inner second straw member are tubular.

4. The straw apparatus of claim 3, wherein said tubular outer first straw member and inner second straw member are circular or oval in cross section.

5. The straw apparatus of claim 3, wherein said outer first straw member and said inner second straw member are circular in cross section.

6. The straw apparatus of claim 1, wherein said outer first straw member and said inner second straw member have a diameter from about 3 mm to about 20 mm.

7. The straw apparatus of claim 1, wherein said vein members of said outer first straw member are each defined by two parallel slits having a vein distance width from about 1% to 3% the length of straw.

8. The straw apparatus of claim 1, wherein said at least one bonding means is at a position selected from the group consisting of:

(a.) the co-located lower end of said outer first straw member and said lower end of said inner second straw member where said first length of said outer first straw member is longer than said second length of said inner second straw member (b.) the upper end of said outer first straw member where said first length of said outer first straw member is shorter than said second length of said inner second straw member and said lower end of said outer first straw member is below the lower end of said inner second straw member (c.) the upper end of said inner second straw member where said first length of said outer first straw member is longer than said second length of said inner second straw member and where said lower end of said inner shorter second straw member is above the lower end of said longer outer first straw member (d.) and where the lower end of said outer first straw member and the lower end of said inner second straw member are co-located and said inner second straw member has a collapsible accordion region; and at the upper end of said outer first straw member.

9. The straw apparatus of claim 1, having a length from about 100 mm to about 400 mm.

10. The straw apparatus of claim 1, wherein said means for stopping deployment of said radially expandable vein members expanding from said upper and lower hinge attachment means at a predetermined position is selected from the group consisting of: friction, notching, tapering, detenting, harmonic compression and any combination thereof.

11. The straw apparatus of claim 1, wherein said bending means of said vein members is selected from the group consisting of: vein member crimp/crease, vein member perforation, vein member thinning, vein member material properties or any combination thereof.

12. A method for deploying said expandable drinking and mixing straw apparatus of claim 1 comprising:

applying downwardly directed force to the upper end of said outer first straw member of said straw apparatus;

expanding and buckling said plurality of radially expandable vein members of said outer first straw member from their upper and lower hinge attachment means;

buckling said plurality of said expanding vein members at said one or more means between said upper and lower hinge attachment means; and stopping the expanding and buckling of said vein members at a predetermined position with said means for stopping deployment of said radially expandable vein members; and thereafter providing a deployed drinking and mixing straw apparatus.

13. The method of claim 12, wherein said at least one bonding means between said outer first straw member and said inner second straw member is located at a position selected from the group consisting of: the co-located lower ends of said outer first straw member and said inner second straw member where said first length of said outer first straw member is longer than said inner second straw member length of said inner second straw member; the upper end of said outer first straw member where said first length of said outer first straw member is shorter than said second length of said inner second straw member and said lower end of said outer first straw member is below the lower end of said inner second straw member; the upper end of said inner second straw member where said first length of said outer first straw member is longer than said second length of said inner second straw member and where said lower end of said inner shorter second straw member is above the lower end of said longer outer first straw member; and where the lower ends of said outer first straw member and said inner second straw member are co-located and said inner second straw member has a collapsible accordion region, and at the upper end of said outer first straw member.

14. The method of claim 12, wherein said buckling means of said plurality of expanding vein members is selected from the group consisting of: vein member crimp, vein member perforation, vein member thinning, vein member material properties or any combination thereof.

15. The method of claim 12, wherein said stopping of said expanding and buckling vein members at a predetermined position is provided by a stopping means selected form the group consisting of: friction, notching, tapering, detenting, harmonic compression, and any combination thereof.

16. The straw apparatus according to claim 1, further comprising:
a collapsible accordion region;
wherein the straw has a diameter shape selected from the group of: tubular, circular, square, rectangular or polygon having a plurality of equal sides; and
wherein said plurality of vein members are expandable radially upon the application of downward force on the upper end of said outer first straw member.

17. The straw apparatus of claim 16, wherein said means for stopping deployment of said radially expandable vein members expanding from said upper and lower hinge attachment means is selected from the group consisting of: friction, notching, tapering, detenting, harmonic compression and any combination thereof.

18. The straw apparatus of claim 16, wherein said buckling means of said vein members is selected from the group consisting of: vein member crimp/crease, vein member perforation, vein member thinning, vein member material properties or any combination thereof.

19. The straw apparatus of claim 16, wherein said vein members are each defined by two parallel slits having a width from 1% to 3% the length of said straw, and wherein said vein members range in length from 5% to 40% of the length of the straw.

20. The straw apparatus of claim 16, wherein said straw has a diameter from about 3 mm to about 20 mm, and has a length from about 100 mm to about 400 mm.

21. The straw apparatus of claim 1 wherein said inner second straw member has a collapsible accordion region.

22. The straw apparatus of claim 6, wherein said outer first straw member and said inner second straw member each have a diameter from about 5 mm to about 8 mm.

23. The straw apparatus of claim 7 having an ideal vein distance width equal to $2\pi r$ divided by the number of desired slits, and range in length from 5% to 40% of the length of the straw.

24. The straw apparatus of claim 9, having a length from about 200 mm to about 300 mm.

25. The straw apparatus of claim 20, wherein said straw has a diameter from about 5 mm to about 8 mm and a length from about 200 mm to about 300 mm.

26. The straw apparatus of claim 19, wherein said straw has a diameter from about 5 mm to about 8 mm.

* * * * *